(12) United States Patent
Morgese

(10) Patent No.: US 10,807,423 B2
(45) Date of Patent: Oct. 20, 2020

(54) ICE AND SNOW CLEATS FOR AUTOMOBILE AND TRUCK TIRES

(71) Applicant: Joseph Morgese, Daytona Beach, FL (US)

(72) Inventor: Joseph Morgese, Daytona Beach, FL (US)

( * ) Notice: Subject to any disclaimer, the term of this patent is extended or adjusted under 35 U.S.C. 154(b) by 239 days.

(21) Appl. No.: 15/732,876

(22) Filed: Jan. 8, 2018

(65) Prior Publication Data

US 2019/0210415 A1 Jul. 11, 2019

Related U.S. Application Data

(60) Provisional application No. 62/498,824, filed on Jan. 6, 2017, provisional application No. 62/601,743, filed on Mar. 30, 2017, provisional application No. 62/604,705, filed on Jul. 17, 2017.

(51) Int. Cl.
*B60C 27/00* (2006.01)
*B60C 27/04* (2006.01)
*B60C 27/20* (2006.01)
*B60C 27/02* (2006.01)

(52) U.S. Cl.
CPC .......... *B60C 27/04* (2013.01); *B60C 27/0207* (2013.01); *B60C 27/0269* (2013.01); *B60C 27/20* (2013.01)

(58) Field of Classification Search
CPC .............. B60C 27/023; B60C 27/0238; B60C 27/0246; B60C 27/04; B60C 27/0207; B60C 27/061; B60C 27/068; B60C 27/08; B60C 27/10; B60C 27/12; B60C 27/20; B60C 27/22; B60C 27/0261; B60C 27/062
See application file for complete search history.

(56) References Cited

U.S. PATENT DOCUMENTS

| 2,528,165 A | * | 10/1950 | Nickerson, Jr. | .......... B60C 27/12 152/226 |
| 3,016,079 A | * | 1/1962 | Weller | .................... B60C 27/12 152/218 |
| 3,120,256 A | * | 2/1964 | Sekelsky | ................. B60C 27/12 152/218 |
| 3,996,984 A | * | 12/1976 | Mezzacapo | ............. B60C 27/04 152/225 R |
| 2008/0223496 A1 | * | 9/2008 | Maggi | ................... B60C 27/063 152/218 |

* cited by examiner

*Primary Examiner* — Blake A Tankersley

(57) ABSTRACT

A method for providing additional tractionability to a vehicle tire (20) for mitigating slippery road conditions such as ice and snow. The main embodiment for the main embodiment uses three cleats (26) per tire (20) and a cleat hub (28). Chain welts (32) and adjustable bungee cords (30) complete the install to form a contiguous unit gripping around the perimeter of the tire (20). All of the individual parts are lightweight for easy distribution to the tires (20) needing traction. They are easy to install. They are quick to install at roughly five minutes per tire (20). They are also both easy and quick to dismantle. Being solid bodied members, they are easy to keep clean by quickly hosing them down and they stack up for easy storage.

20 Claims, 54 Drawing Sheets

ICE AND SNOW CLEATS FOR AUTOMOBILE AND TRUCK TIRES

BACKGROUND

Prior Art

The following is a tabulation of some prior art that presently appears relevant:

U.S. Patents 1904 by Harry D. Weed in Canastota, N.Y.
U.S. Pat. No. 768,495 "Grip-Tread for Pneumatic Tires" on Aug. 23, 1904

Nonpatent Literature Documents

Wikipedia on line at https://en.wikipedia.org/wiki/Snow chains
You Tube on line at https://www.youtube.com/watch?v=bUcEXOyQolc Having driven eighteen wheeler trucks across all of the USA and Canada for twenty two years, since 1995, and all through this time, I kept asking myself why there wasn't a simpler way of dealing with icy and snowy roads and parking lots.

The current common practice of using tire chains is a daunting task:

1—They are heavy! A set of single tire chains weighs 25 pounds. Double tire chains are 50 pounds.
2—Unless brand new, they are usually very dirty with road grime.
3—Since they are made of steel, they get very dirty with rust.
4—The hooks within the chain sets tend to get very entangled in the chains and are almost impossible to straighten out.
5—They are required at the worst possible time! The weather is bad enough that you are required to pull over on the side of the road, get out into that really bad weather and put chains on your tires!

Proposed Solution—1/3

My Ice and Snow Cleats address each and every issue cited above:

1—"They are heavy!. A set of single tire chains weighs 25 pounds. Double tire chains are 50 pounds."

Each part of the Ice and Snow Cleats method is lightweight and the driver can choose how many parts they would carry at a time. Depending on which materials are used, it may be possible to have no single individual part that weighs more than 5 pounds!

2—"Unless brand new, they are usually very dirty with road grime.".

The cleats and hub are solid pieces and thus are easily washable and stack up for easy storage. The chain welts and adjustable bungee cords store in a bucket.

Proposed Solution—2/3

3—"Since they are made of steel, they get very dirty with rust."

While the chain welts are made of steel as well, they actually store in a bucket and so are less susceptible to rusting. Even so, they represent a small percentile of the entire Ice and Snow Cleat method. The other parts such as the cleats themselves can be made of hard rubber, fiberglass, aluminum, and any combination of these or materials of like kind.

4—"The hooks within the chain sets tend to get very entangled in the chains and are almost impossible to straighten out."

Such is the nature of chains which we are blissfully not having to deal with except for the small and easy to manage chain welts.

Proposed Solution—3/3

5—"They are required at the worst possible time! The weather is bad enough that you are required to pull over on the side of the road, get out into that really bad weather and put chains on your tires!"

While it's true that we still have to contend with the bad weather and dangerous road conditions, at least using the 'Ice and Snow Cleats' is simpler and quicker. Whenever you pull over, you start by distributing the needed parts to each tire requiring cleating, then proceed to each tire with your stool to sit on, and begin building the assembly right there at the tire. A process which takes about five minutes per tire.

Advantages

Accordingly, the advantages are:

1—The individual parts are all lightweight, and so the driver can decide how much weight they may want to bear while distributing the parts to the tires for installation.
2—They are full bodied parts that are stackable for elegant storage.
3—Being full bodied, they are easy to clean up as well by merely hosing them down.
4—They are free of hooks and so they don't get entangled like the prior art chains do.
5—They assemble in just five minutes per tire. They dismantle even faster!
6—They are versatile for different applications. For example, a driver can acquire an array of cleats specially designed for unique situations, such as, deep mud cleats, rock salt enclustered cleats. Another example, regarding a second embodiment, whereby we entertain the ability to very quickly use just one cleat.
7—The cleats provide an avenue for trying out new materials either alone or in combination, as they come out.

These and other benefits of one or more aspects will become apparent from a consideration of the ensuing description and accompanying drawings.

DRAWINGS—FIGURES 1/2

Figure 3A:
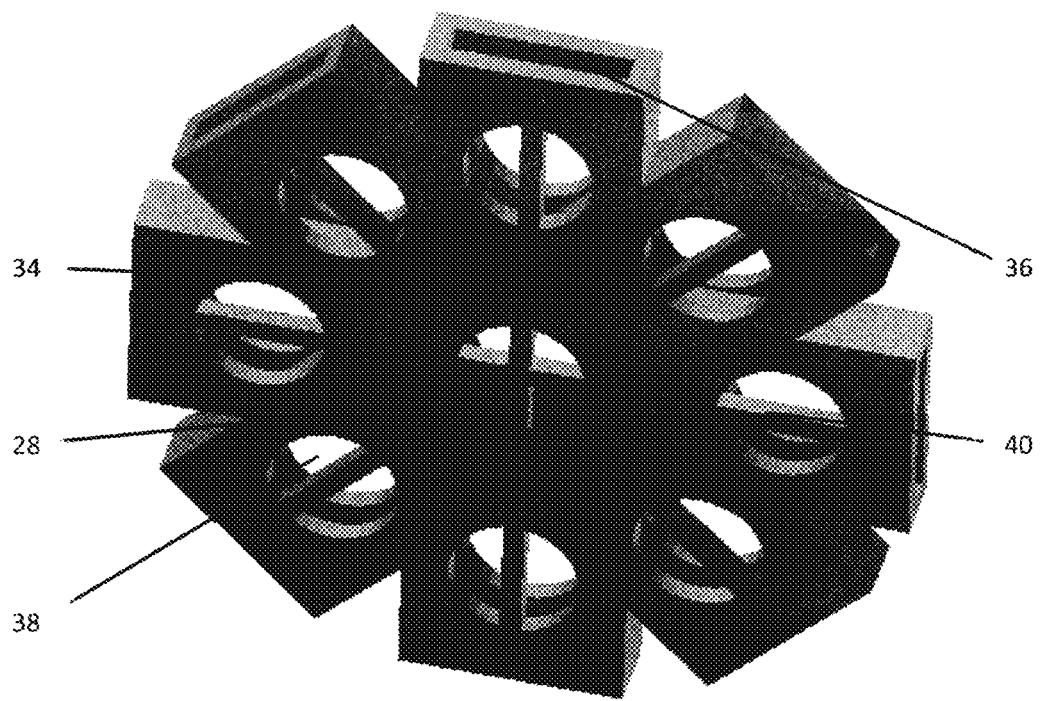
Figure 4A:
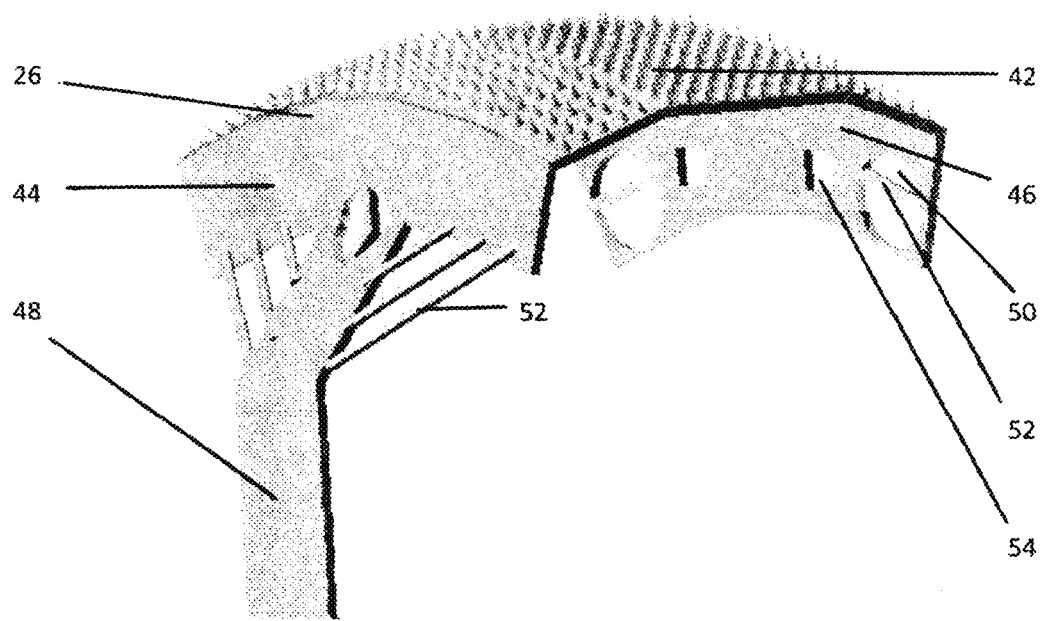
Figure 4B:
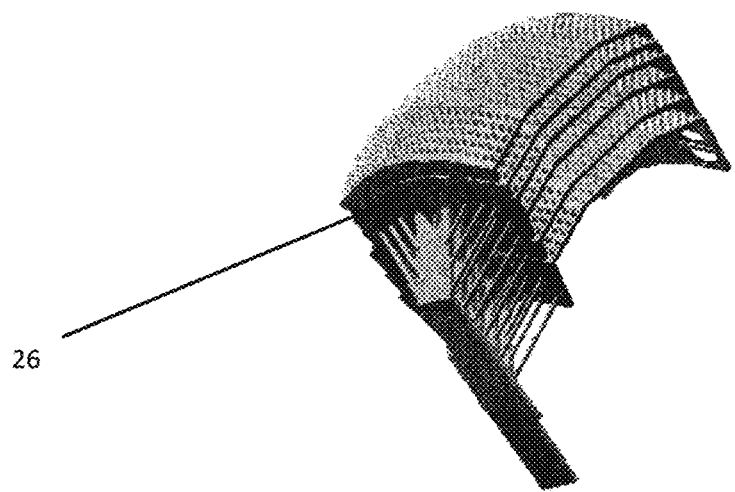
Figure 4C:
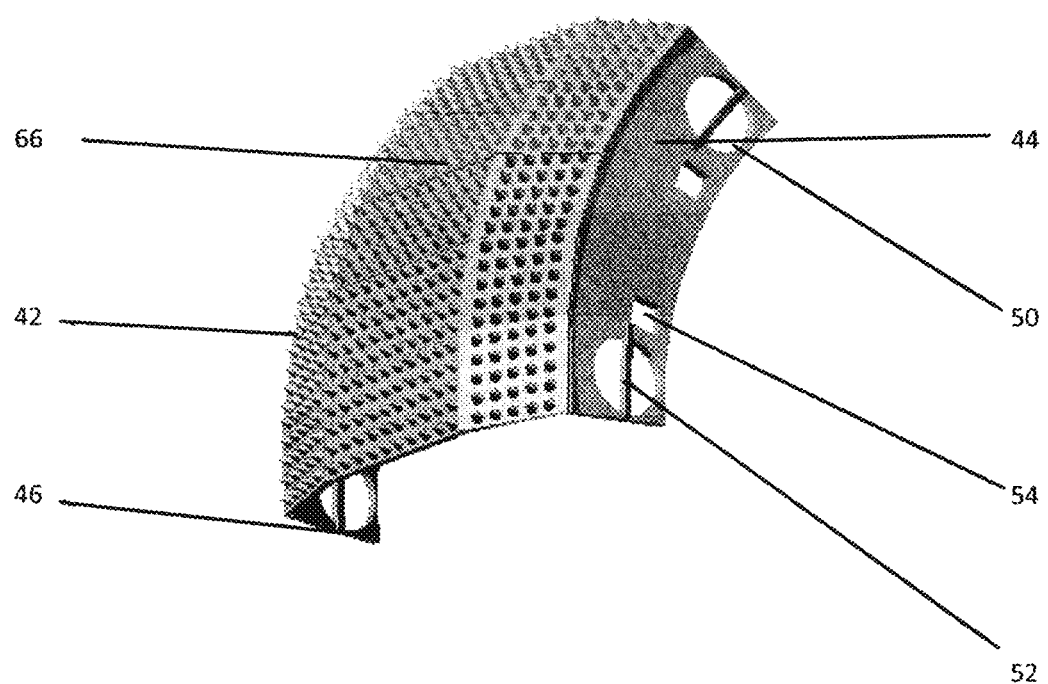
Figure 4D:
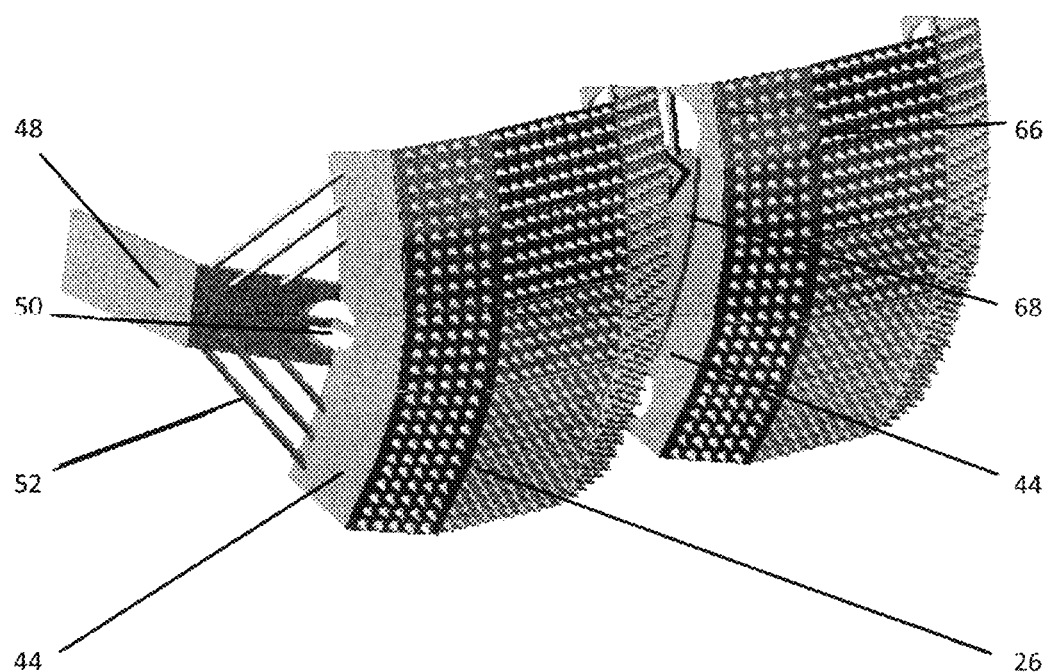

FIG. 3a shows the cleat hub.
FIG. 4a shows a cleat.
FIG. 4b shows the stackability function of the cleats.
FIG. 4c shows an inner tire cleat.
FIG. 4d shows a set of cleats, the inner and the standard cleat, as applied to a set of dual tires.

Figure 4E:
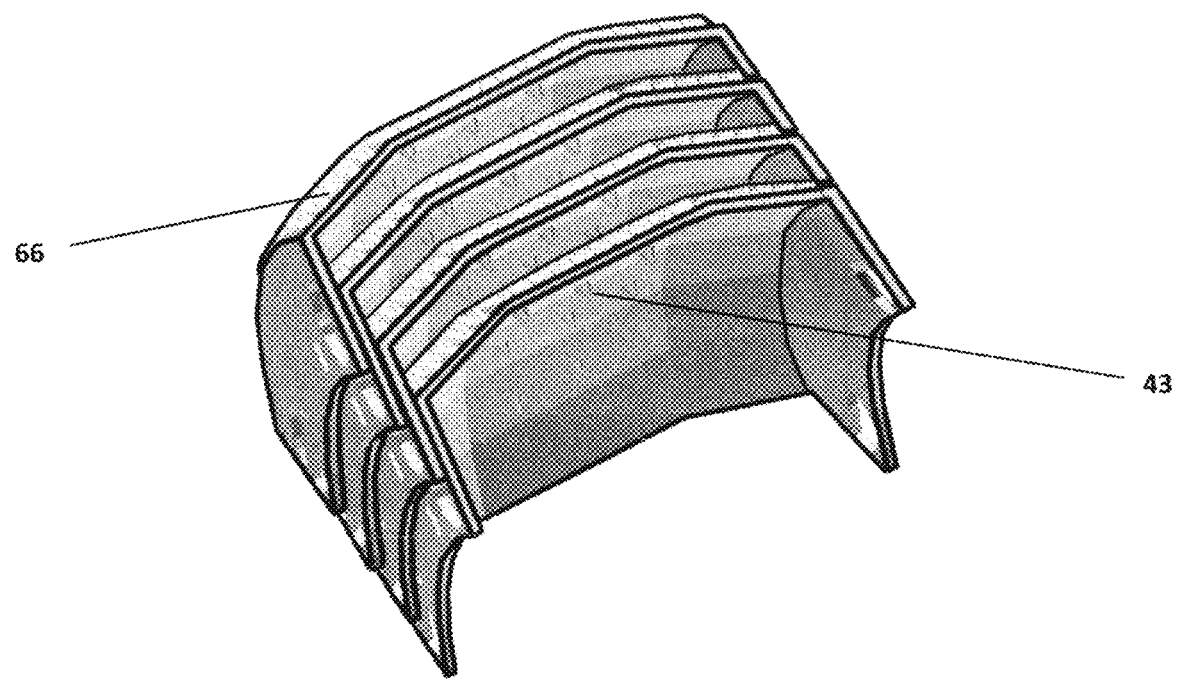

FIG. 4e shows the stackability feature of the inner cleats.

Figure 4F:
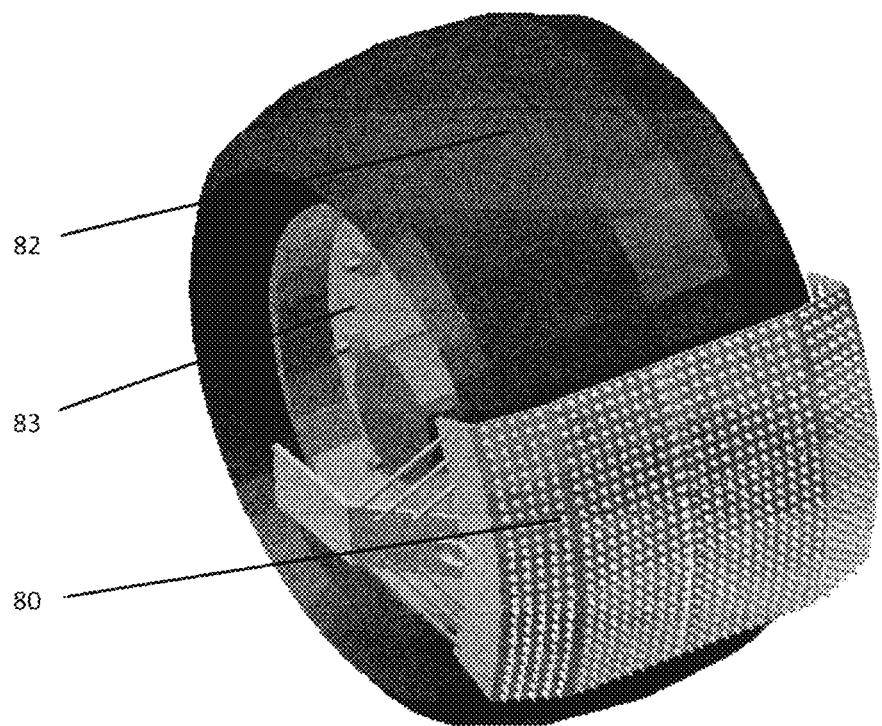

FIG. 4f shows a super single cleat.

Figure 4G:
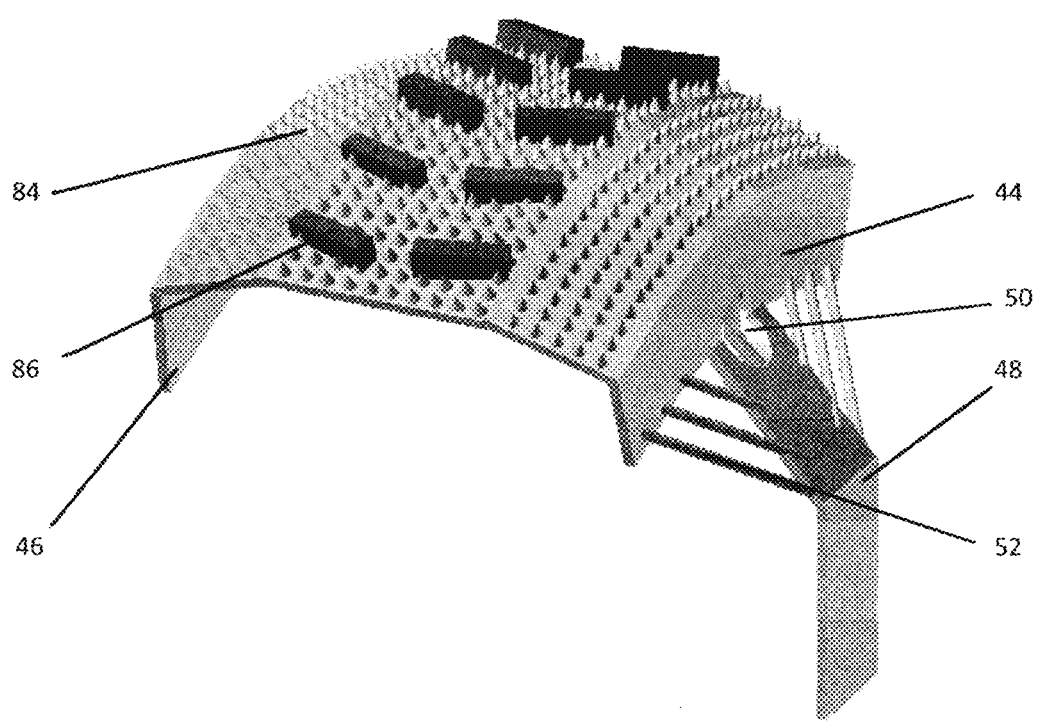

FIG. 4g shows a special design cleat for a deep mud application.

FIGS. 5a through 5d show various parts of the adjustable bungee cord.

Figure 6A:
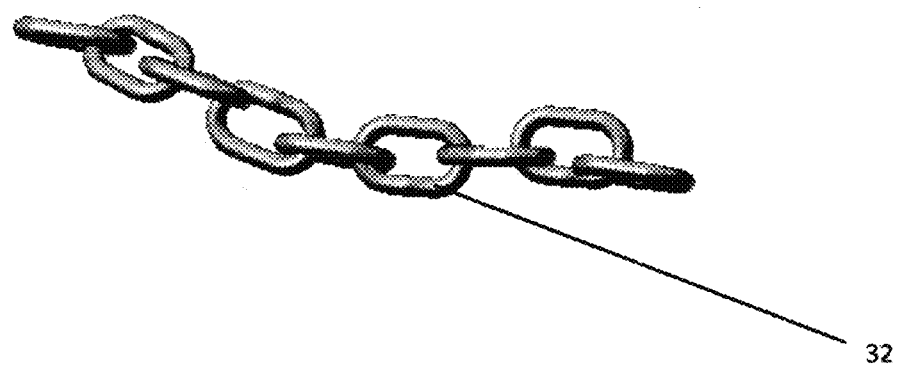

FIG. 6a shows a welt of chain.

Figure 6B:
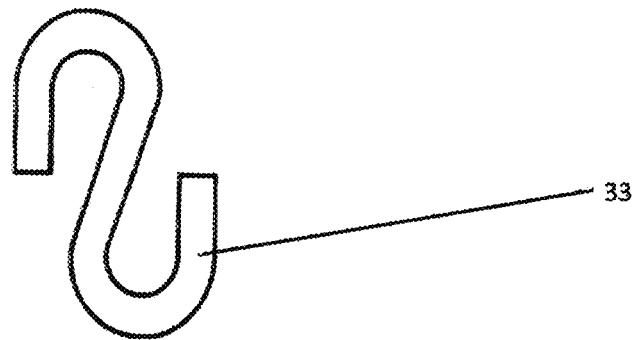

FIG. 6b shows an S-hook.

DRAWINGS—FIGURES CONTINUED 2/2

Figure 7A:
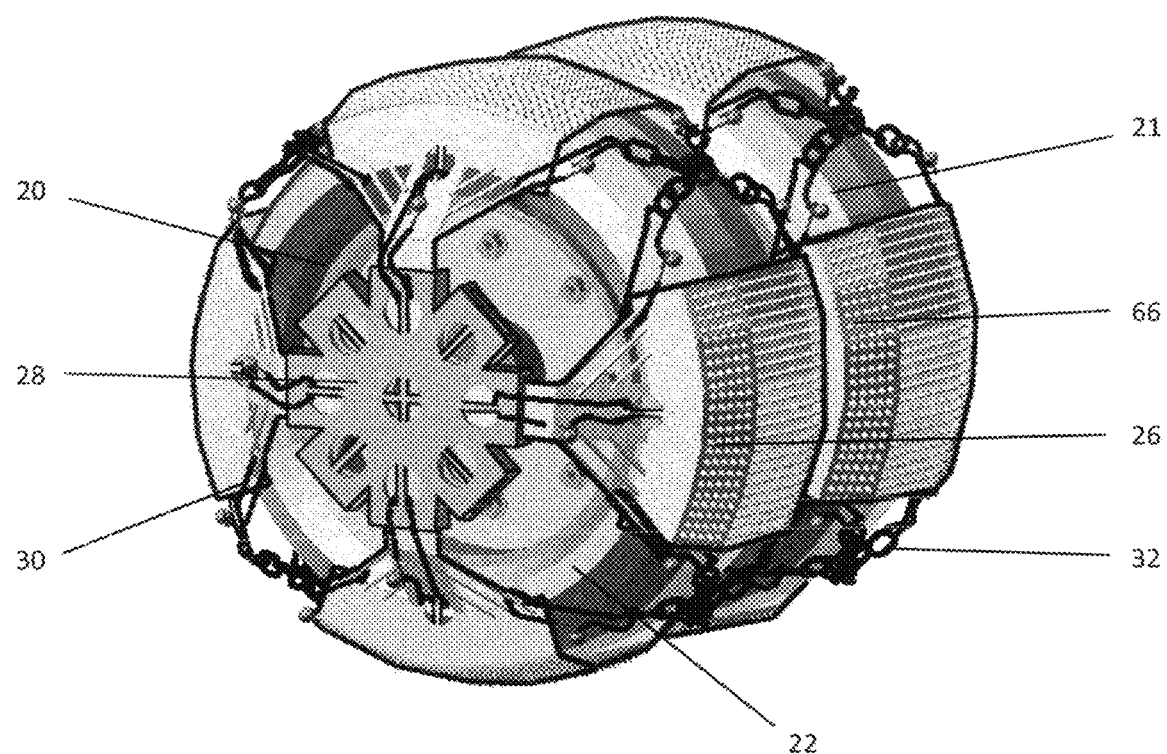

FIG. 7a shows a four cleat assembly for a set of dual tires.

Figure 8A:
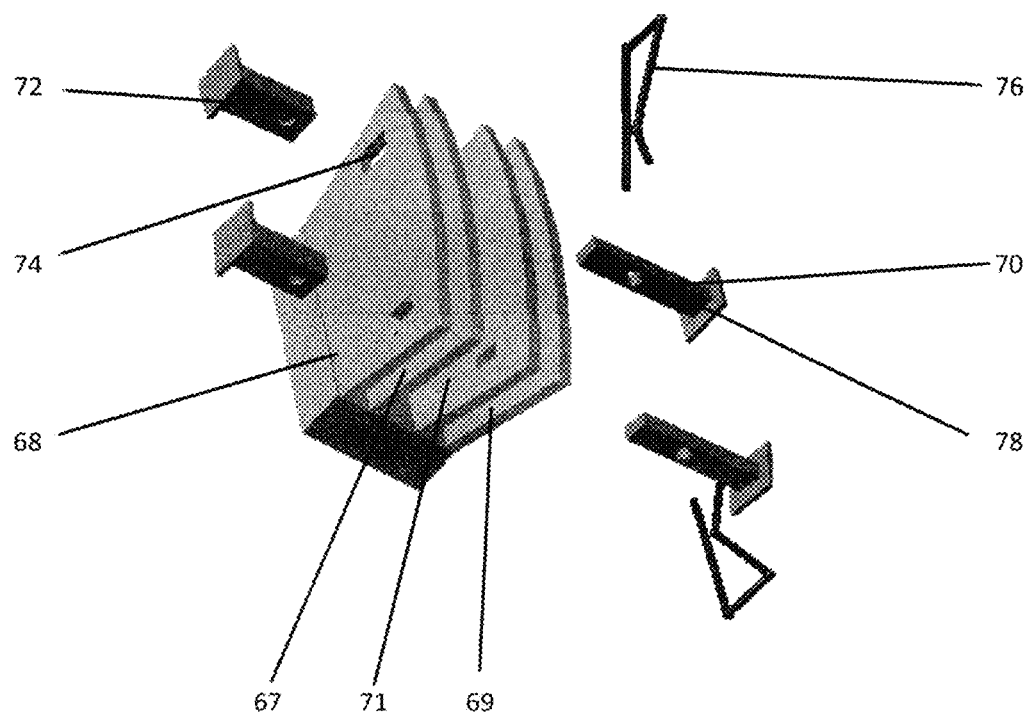
Figure 8B:
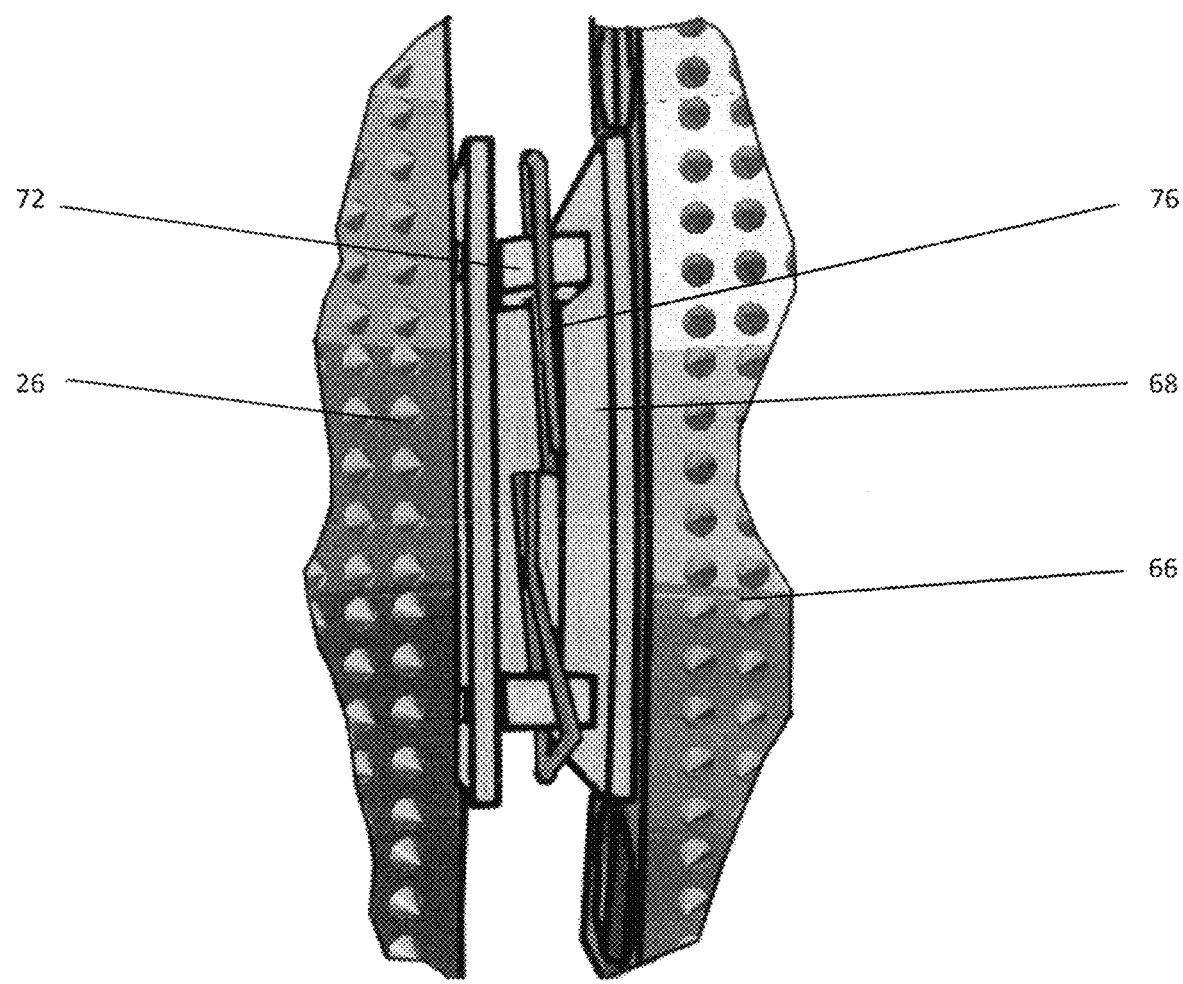

FIGS. 8a and 8b show the bridging parts that connect the standard cleat with the inner cleat.

FIGS. 9a through 9h show the step by step methodology for installing three cleats.

FIGS. 10d through 10i show the step by step methodology for installing four cleats.

FIGS. 11a through 11m show the step by step methodology for installing four cleats on a set of dual tires.

Figure 12A:
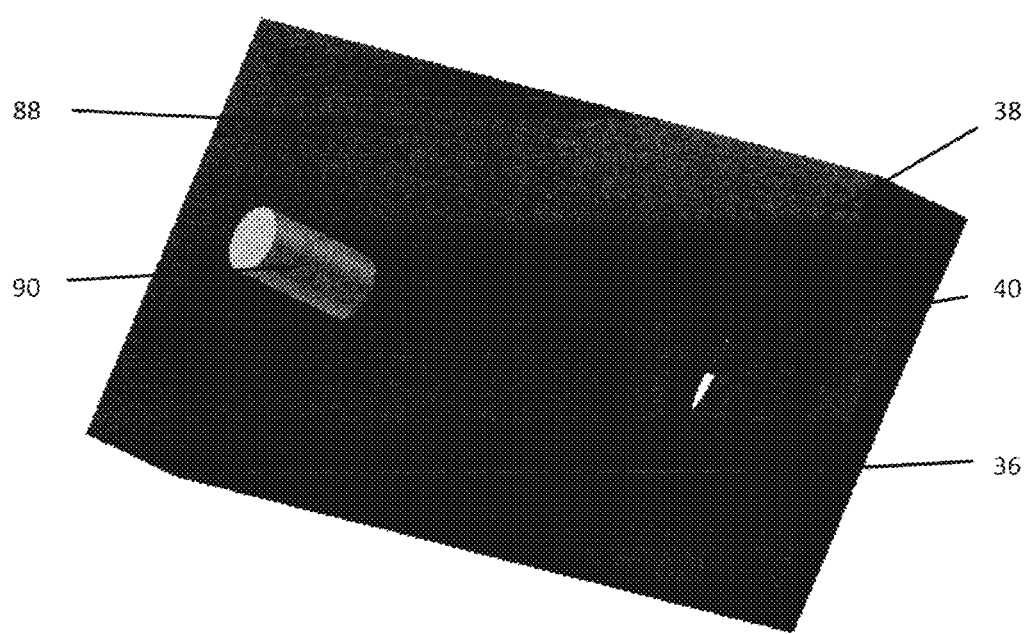
Figure 12B:
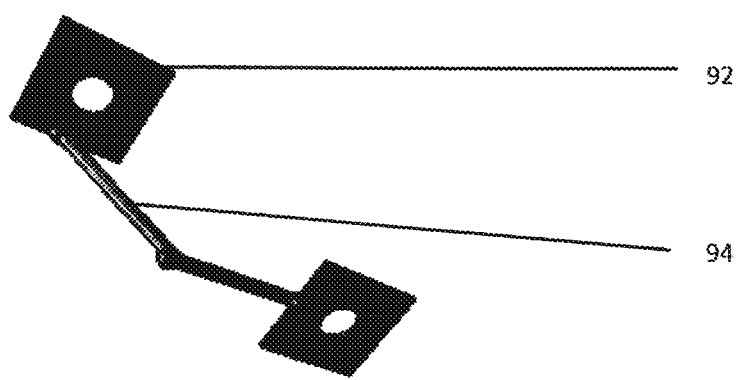
Figure 12C:
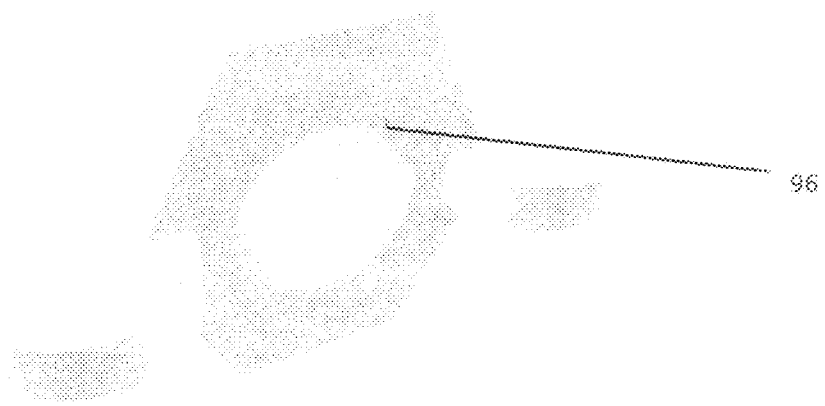

FIGS. 12a through 12c show the individual parts additional for a second embodiment.

Figure 12D:
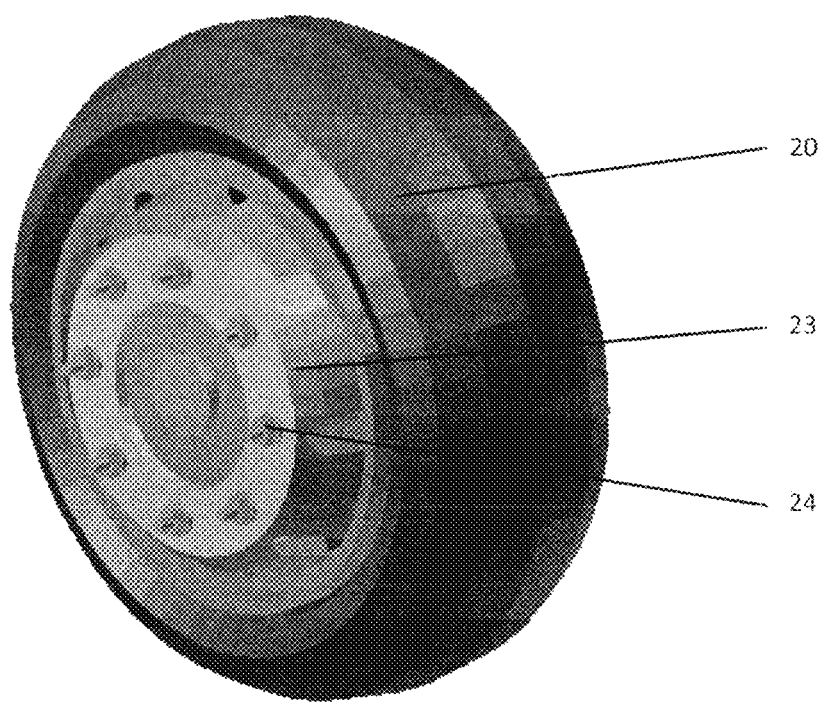
Figure 12E:
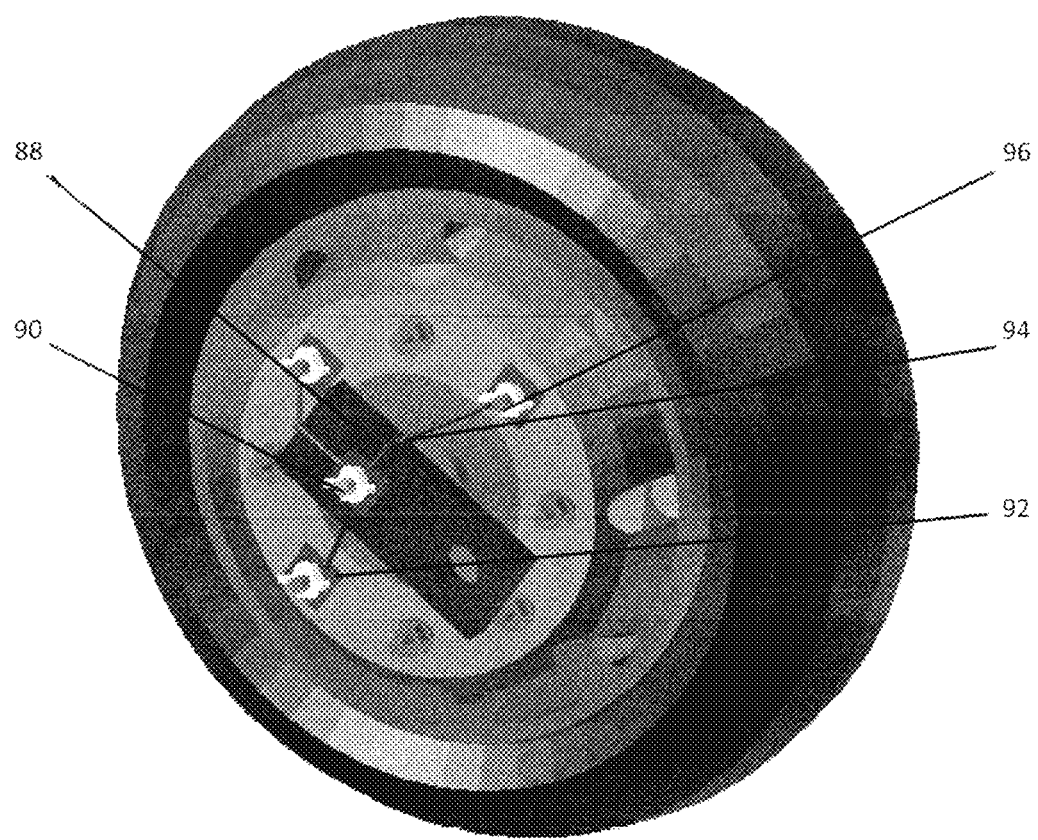
Figure 12F:
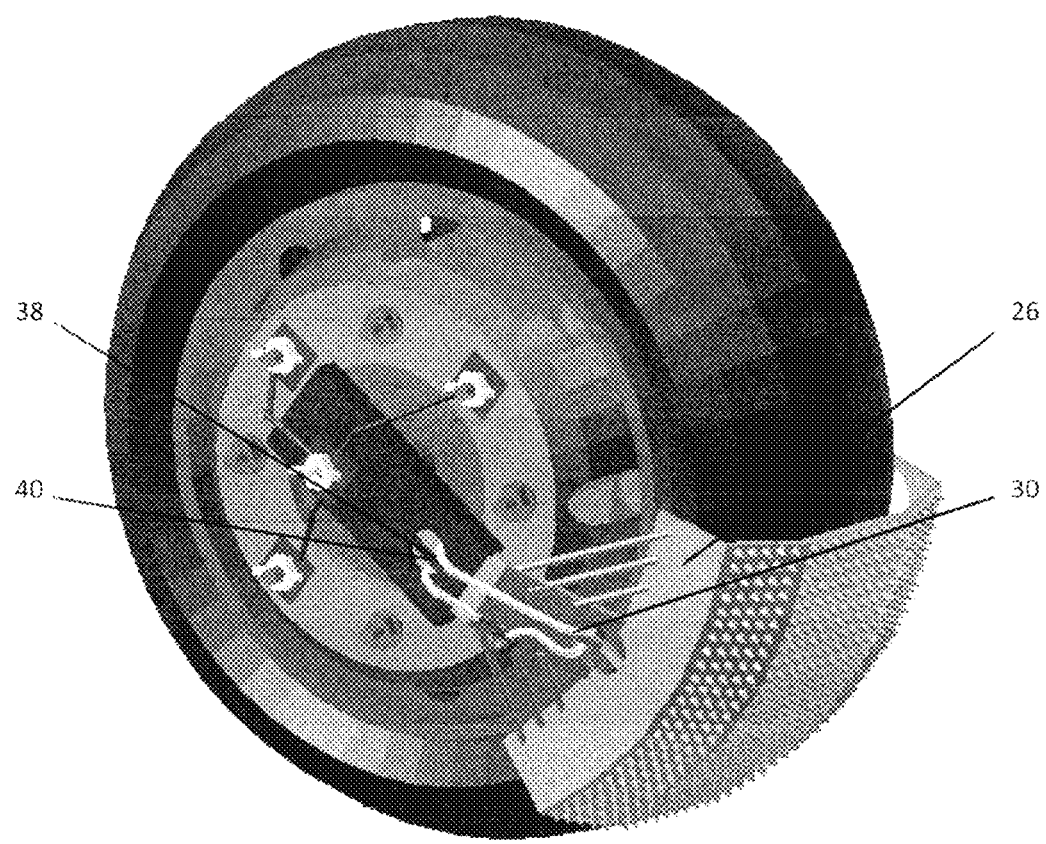

FIGS. 12d through 12f show the step by step methodology for installing the second embodiment.

DRAWINGS—REFERENCE NUMERALS—1/3

20 tire
21 inner tire of a dual set
22 tire rim for drive and trailer
23 tire rim for steer
24 rim nuts and bolts
26 cleat
28 cleat hub
30 adjustable bungee cord assembly
32 chain welt
33 S-hook
34 hub sleeve housing
36 female sleeve opening
38 hub orifice
40 hub fastening bars
42 tractionable material contacting the road surface
43 tractionable material contacting the tire tread

DRAWINGS—REFERENCE NUMERALS—CONTINUED—2/3

44 cleat front overhang
46 cleat rear overhang
48 cleat sleeve insert
50 cleat orifice
52 cleat fastening bars
54 cleat bridge connecting openings
56 adjustable bungee cord
58 adjustable bungee cord hook
60 adjustable bungee cord ball
62 adjustable bungee cord ball orifice
64 adjustable bungee cord ball vice screw
66 cleat inner tire extension
67 overhang sleeve for rear overhang of standard cleat 26
68 cleat inner tire extension bridge
69 overhang sleeve for front overhang of inner extension cleat 66
70 cleat inner tire extension bridge male bolts
71 cotter pin installation opening

DRAWINGS—REFERENCE NUMERALS—CONTINUED—3/3

72 cleat inner tire extension bridge female bolts
74 cleat inner tire extension bridge bolt openings
76 cleat inner tire extension bridge cotter pins
78 cleat inner tire extension bridge cotter pin alignment openings
80 cleat designed for super single truck tires
82 super single truck tire
83 tire rim for super single tire
84 cleat designed for deep mud application
86 deep mud tractionable material
88 single cleat hub
90 hub connection bolt
92 bolt washer
94 connector arm
96 wing nut

DETAILED DESCRIPTION OF DRAWINGS

1 First Embodiment with Three Cleats
2 First Embodiment with Four Cleats
3 Individual Parts for first Embodiment
4 First Embodiment with Four Cleats for a Dual Tire Application
5 Additional Individual Parts for Dual Tire Application
6 Special Applications
7 Operation of First Embodiment with Three Cleats
8 Operation of First Embodiment with Four Cleats
9 Operation of First Embodiment with Four Cleats for Dual Tire Application
10 Second Embodiment Additional Parts
11 Second Embodiment Operation

1 FIRST EMBODIMENT WITH THREE CLEATS 1/2

All designs subject to DOT speed limits of 20 to 30 mph.

Figure 1A:
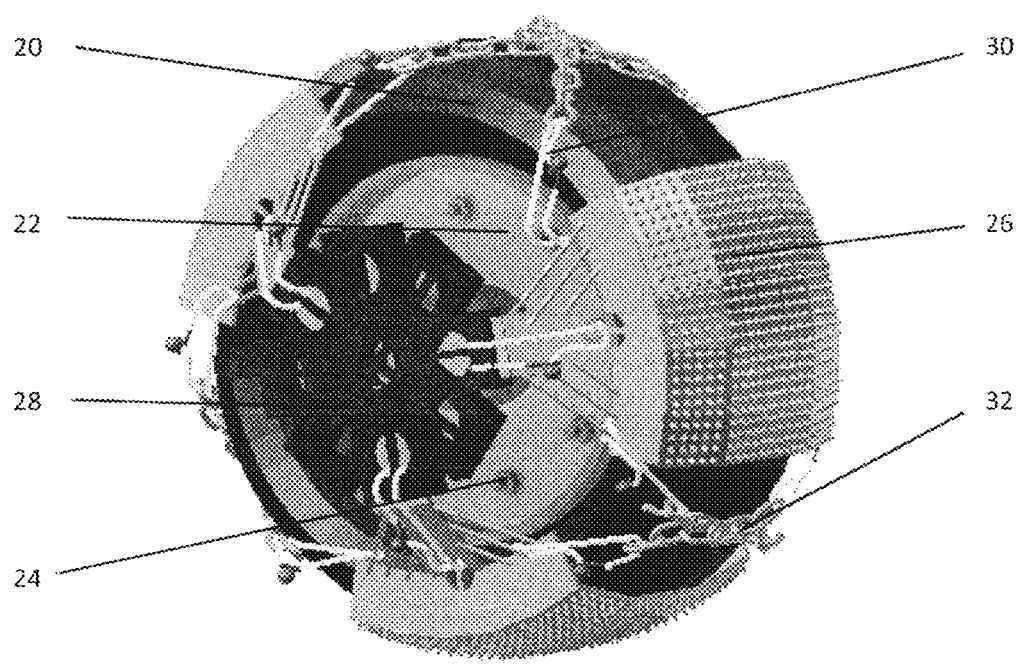
FIGS. 1a to 1c show the main embodiment using three cleats. 1a showing a truck's drive and trailer tire. 1b showing a truck's steer tire. 1c showing an ortho drawing of 1a and can be used to illustrate usage for an automobile tire. It's simply remains a question of scale.

FIG. 1a shows the first embodiment using three cleats. The style of the rim is that which we would find on a tractor trailer drive tires or on trailer tires.

Although not shown, please assume that the bottom of the tire 20 is resting on pavement.

22 is the tire rim. The bolts 24 are set deep within the bowl of the rim. This is a drive tire and trailer tire design as opposed to a steer tire design which has the rim bulging out beyond the tire face plane.

The cleat hub 28 does not attach to the tire 20 or the rim 22, but attaches to the cleats 26 at different degrees around the tire 20. The cleat 26 has a section designed to slide into an opening inside the sleeve of the cleat hub 28 (to be shown in a close up coming soon). Adjustable bungee cords 30 are used to attach the cleats 26 with the cleat hub 28 and with each other. Chain welts 32 are also attached to the cleats 26 along the tire 20 tread with adjustable bungee cords 30.

1 FIRST EMBODIMENT WITH THREE CLEATS CONTINUED 2/2

Figure 1B:
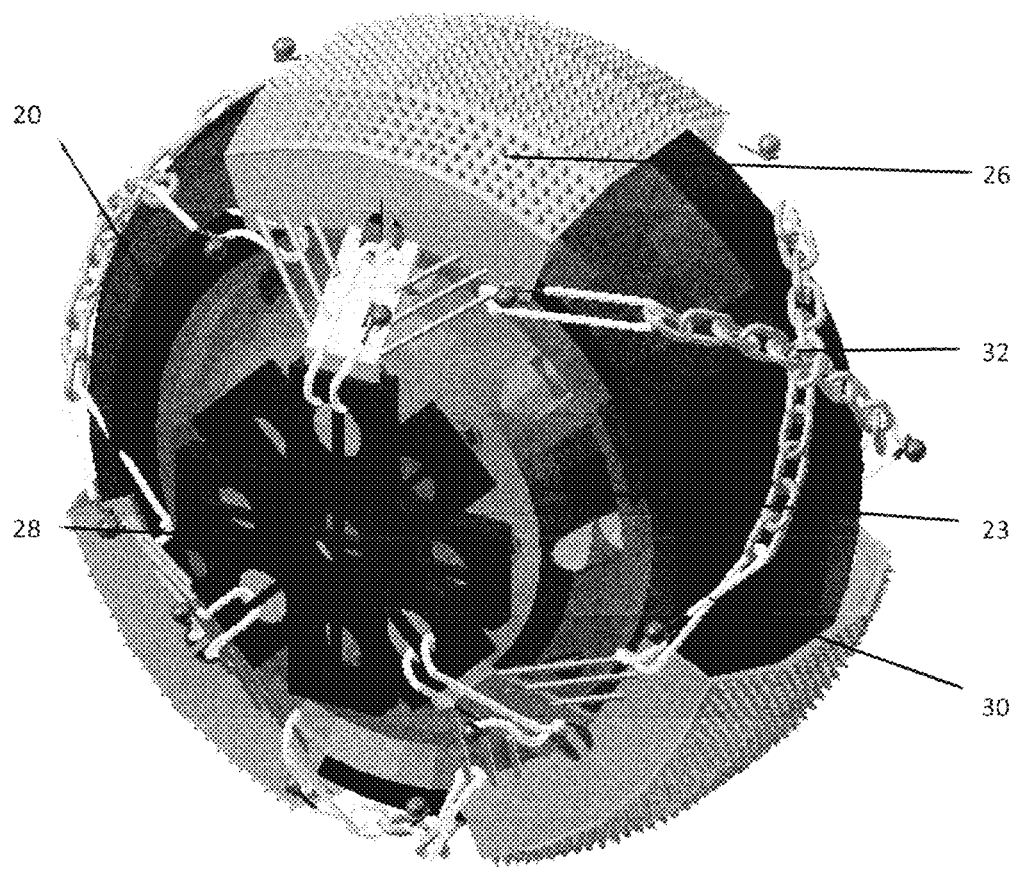

FIG. 1b shows the exact same three cleat assembly for steer tire 20 with steer tire rim 23. The steer tire rim 23 bulges out beyond the plane of the tire's front face. The cleats 26 and hub 28 are designed to allow for both this 23 design and for the drive tire rim 22 design. Just as in FIG. 1a, we see the tire 20, the cleat hub 28, the cleats 26, the adjustable bungee cords 30 connecting the cleats 26 and the hub 28 and the chain welts 32 along the tire 20 tread also using adjustable bungee cords 30 to join the cleats 26.

Figure 1C:
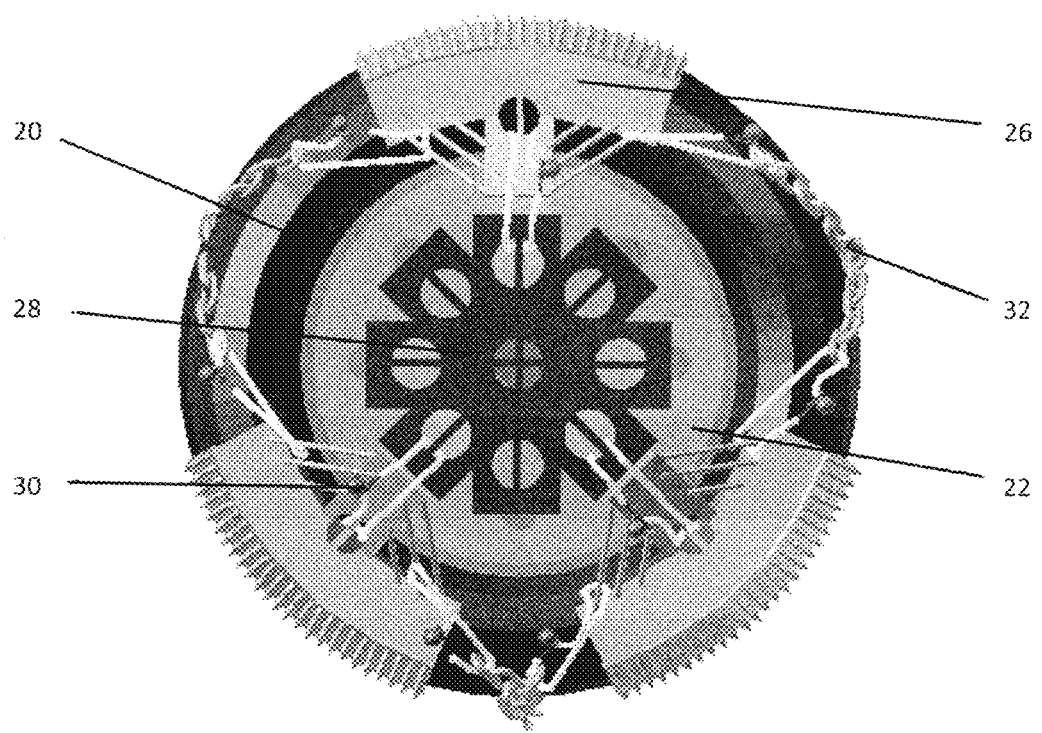

FIG. 1c is the FIG. 1a perspective drawing in ortho mode. Showing the tire 20 resting on the pavement (not shown). Three cleats 26 surround the tire 20 at the twelve o'clock, eight o'clock and the four o'clock positions. All cleats 26 are joined with the cleat hub 28 using adjustable bungee cords 30 and are also joined to each other 26 using chain welts 32 along the tire 20 tread also using adjustable bungee cords 30 to connect. This ortho mode also helps to show that by scaling down, this invention will serve automobile tires as well. In fact, all parts of are custom fit for the particular tires in question.

2 FIRST EMBODIMENT WITH FOUR CLEATS 1/1

FIG. 2a

This drawing shows the use of four cleats 26. Placed equidistant at twelve o'clock, nine o'clock, three o'clock, and at six o'clock. The cleat hub 28 is designed to accommodate either the three cleat or the four cleat arrangement. The cleats 26 join with the hub 28 using adjustable bungee cords 30 and the cleats are joined to each other by using chain welts 32 along the tire 20 tread also joined by using adjustable bungee cords 30. This tire rim 22 is for drive and trailer tires.

Figure 2A:
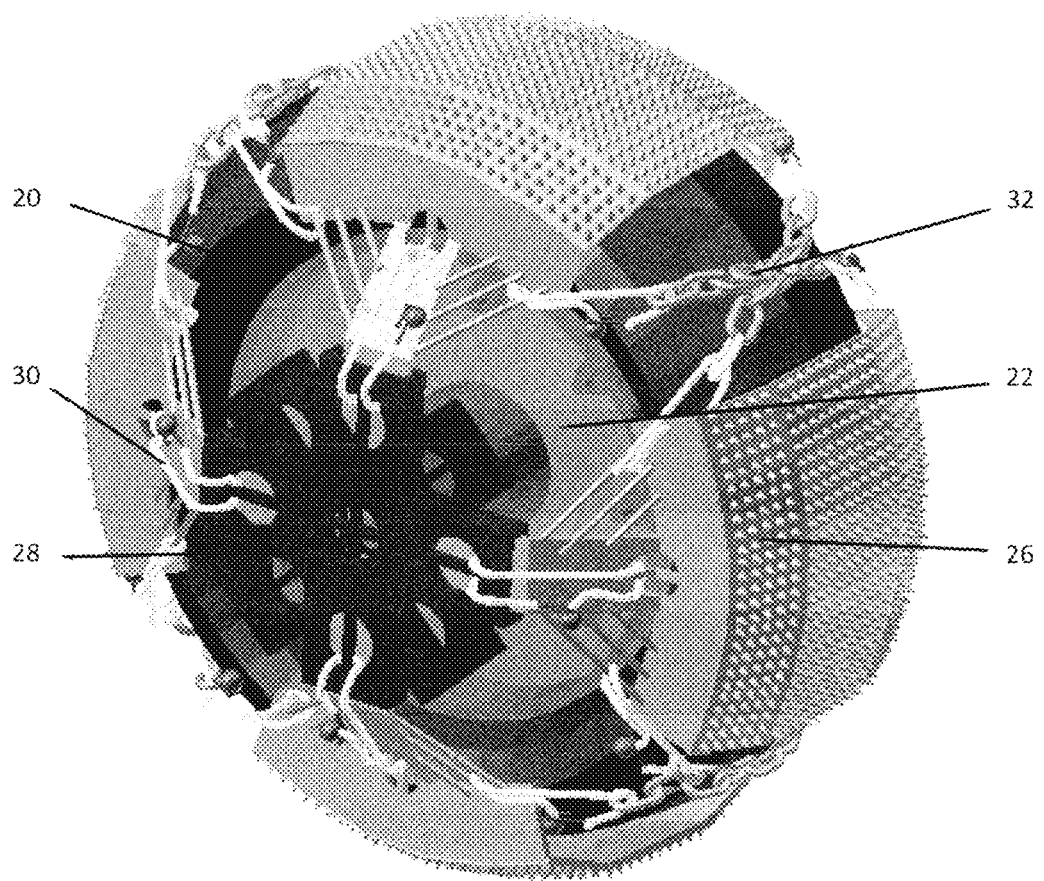
FIGS. 2a and 2b show a four cleat application of the main embodiment for both truck drive and trailer tire and steer tire respectively.
Figure 2B:
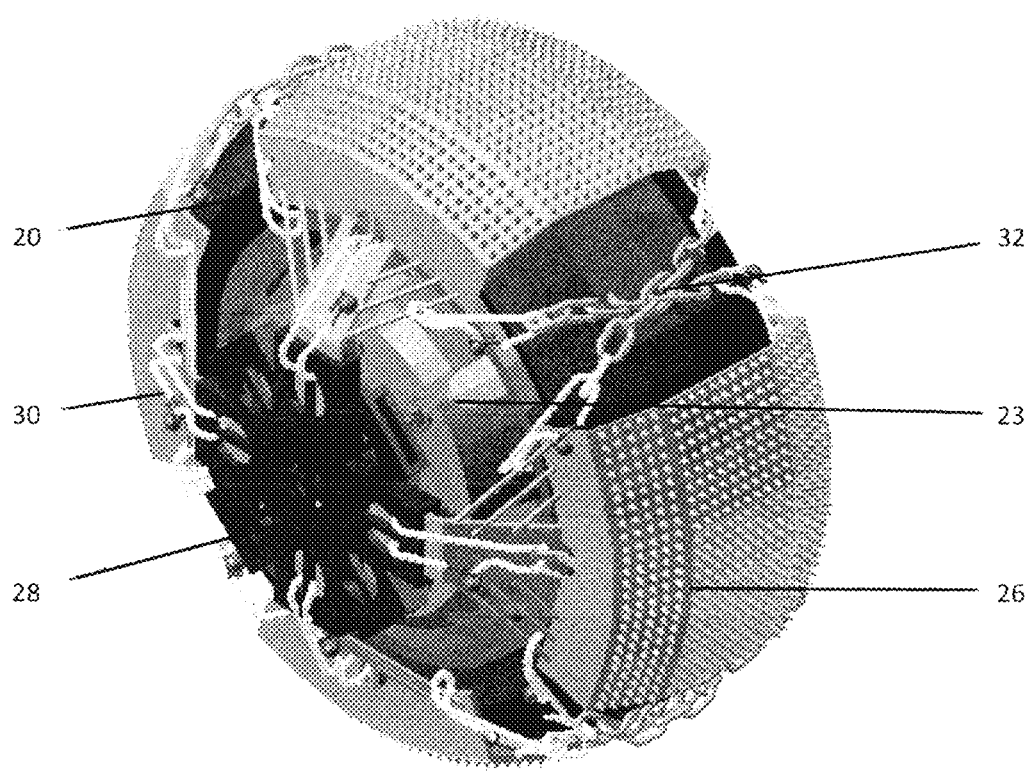

FIG. 2b shows the same as FIG. 2a but is used on a steer tire rim 23. This drawing also shows the use of four cleats 26. Placed equidistant at twelve o'clock, nine o'clock, three o'clock, and at six o'clock. The cleats 26 join with the hub 28 using adjustable bungee cords 30 and the cleats are joined to each other by using chain welts 32 along the tire 20 tread also joined by using adjustable bungee cords 30.

3 INDIVIDUAL PARTS FOR FIRST EMBODIMENT 1/5

FIG. 3a

The cleat hub 28 closeup. A series of sleeves 34 designed to allow various cleat (26 of FIG. 4a) configurations around the tire (20 of FIG. 1a). the sleeves 34 have female sleeve openings 36 all around the outer perimeter of the cleat hub 28 for receiving the cleat sleeve insert (48 of FIG. 4a) of the cleats (26 of FIG. 4a). Also shown here are the hub orifices 38 and hub fastening bars 40, designed for anchoring with the adjustable bungee cords (30 of FIG. 5a). The cleat hub needs to be lightweight yet sturdy. Several ideal materials would be aluminum, hard rubber, fiberglass, and other materials of like kind.

3 INDIVIDUAL PARTS FOR FIRST EMBODIMENT CONTINUED 2/5

FIG. 4a

The cleat 26 is designed to straddle the tire (20 of FIG. 1a) tread. With a front cleat overhang 44 and a rear cleat overhang 46 keeping the cleat securely positioned on the tire tread (20 of FIG. 1a). The cleat 26 has a plurality of tractionable material 42 along the outer surface of the cleat 26 for mitigating slippery road conditions as well as tractionable material (43 of FIG. 11c) against the surface of the tire (20 of FIG. 1a) tread. There are a plurality of cleat fastening bars 52 and orifices 50 for anchoring adjustable bungee cords (30 of FIG. 5a). There are cleat bridge connecting openings 54 along the rear cleat overhang 46 designed for use in a dual tire assembly (see FIG. 7a) which will be discussed later. The cleat sleeve insert 48 is the part that slides into the female sleeve opening (36 of FIG. 3a) of the cleat hub (36 of FIG. 3a). Several ideal materials either on their own or in combination would be aluminum, hard rubber, fiberglass, and other materials of like kind.

FIG. 4b shows the stackability feature of the cleat 26

3 INDIVIDUAL PARTS FOR FIRST EMBODIMENT CONTINUED 3/5

FIG. 5a

The adjustable bungee cord assembly 30 comprises of the hook 58, attached at one end of the bungee cord 56, and the ball 60, which provides the length adjustability function by sliding along the length of the bungee cord 56 and once the desired length is attained, the ball's 60 vice screws (64 of FIG. 5b) are tightened against the bungee cord in order to keep the ball 60 fixed at that needed bungee cord 56 length. The bungee cord 56 is a stretchable material that helps the cleats(26 of FIG. 4a) and chain welts (32 of FIG. 1a) form a contiguous and taut formation around the tire (20 of FIG. 1a). The hook 58 and ball 60 need to be of a strong sturdy solid material to be able to resist the pressures bore on them from intended use.

Figure 5A:
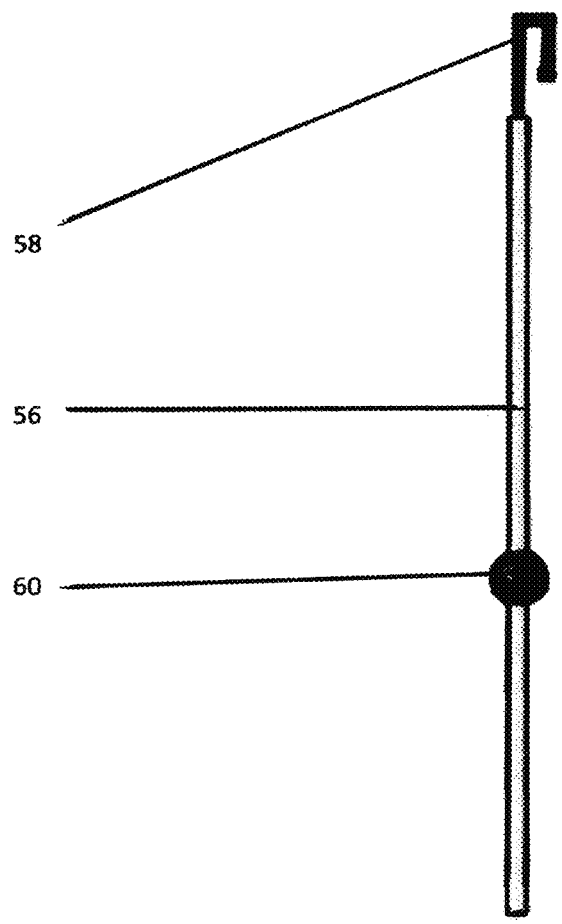
Figure 5B:
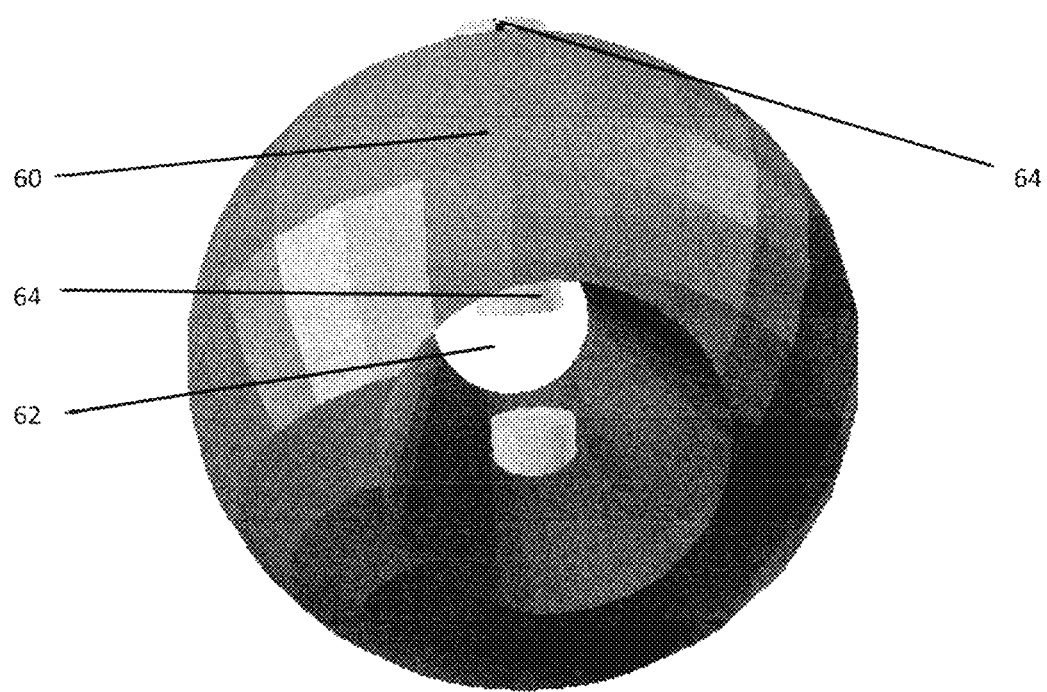
Figure 5C:
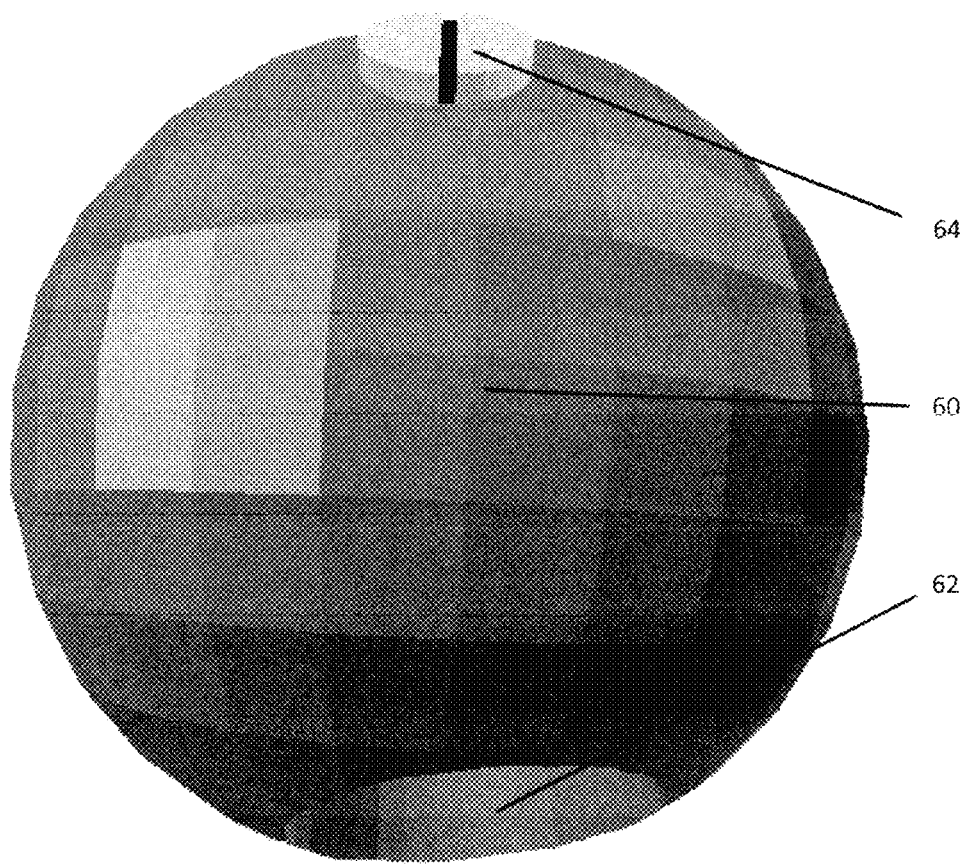
Figure 5D:
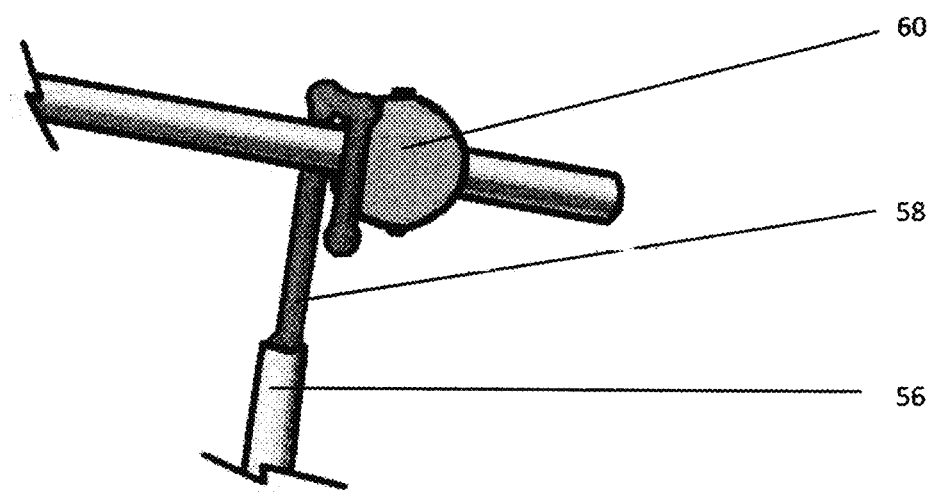

FIGS. 5b and 5c

The ball 60 has an orifice 62 where the bungee cord (56 of FIG. 5a) slides through to allow the adjustability feature. When the right length is attained, the vice screws 64 are then tightened against the bungee cord (56 of FIG. 5a).

3 INDIVIDUAL PARTS FOR FIRST EMBODIMENT CONTINUED 4/5

FIG. 5d

When the adjustable bungee cord 30 is installed on this invention, the stretching feature of the bungee cord 56 causes the ball 60 to press against the hook 58 thus keeping the bungee cord assembly taut yin order to do the vital work of maintaining a tight grip for the cleats (26 of FIG. 1a) against the tire (20 of FIG. 1a) tread.

FIG. 6a

The chain welt 32 is your common everyday chain of the proper thickness to do the required job of providing traction along with the cleats (26 of FIG. 4a) against the icey and snowy road surface. The chain welts 32 are pre-cut to exact required lengths.

3 INDIVIDUAL PARTS FOR FIRST EMBODIMENT CONTINUED 5/5

The adjustable bungee cord assembly (30 of FIG. 5a) is representative of a means for joining the cleats (26 of FIG. 1a), cleat hub (28 of FIG. 1a), and chain welts (32 of FIG. 1a) together securely with elasticity and which connect with speed and ease. Any number of means exist already in the marketplace which help to satisfy these qualities heretofore mentioned, such as the S-hook of FIG. 6b.

FIG. 6b

The S-hook 33 is a very handy part which a driver may choose to use for a quick and easy method of joining the adjustable bungee cords 30 to the chain welts (32 of FIG. 1a), the cleats (26 of FIG. 1a), and the cleat hub (28 of FIG.

1a). It is an intermediary part which works well wherever the installation is taut enough to prevent the S-hook 33 from disconnecting. One way of enhancing security with this is to apply duct tape along both sides of the S-hook 33 to prevent any disconnecting possibilities.

4 FIRST EMBODIMENT WITH FOUR CLEATS FOR A DUAL TIRE APPLICATION 1/1

FIG. 7a

Sometimes, when the weather is bad enough, and also depending on which state of the union the truck may be traveling in, it may be required for both the inner and outer tires of a dual assembly to be chained. This figure shows a dual tire assembly. It is brought about in the exact same fashion as a single tire application except that there is an abridging of the inner tire cleat 66 to the standard out cleat 26 by using a bridge (68 of FIG. 8a). This figure illustrates the four cleat version. Cleats 26 at twelve o'clock, nine o'clock, six o'clock, and three o'clock. We are seeing rim 22 as what would be found in a dual set assembly. We have the cleat hub 28, where the four cleats 26 are joined using adjustable bungee cords 30. We have the outer truck tire 20 and the inner tire 21 both of which get cleats 26 and 66 and chain welts 32, all connected together with taut adjustable bungee straps 30.

5 ADDITIONAL INDIVIDUAL PARTS FOR DUAL TIRE APPLICATION 1/2

FIG. 4c

The cleat inner tire extension 66 does the exact same work as the standard cleat (26 of FIG. 4d), with both a front overhang 44 and a rear overhang 46 to keep the cleat 66 securely positioned on the inner tire (21 of FIG. 7a). The cleat 66 has the same tractionable material 42 as cleat 26. The cleat 66 has the same orifices 50 and fastening bars 52 as cleat 26. The front overhang of cleat 66 has cleat bridge connecting openings 54 that allow the bridge (68 of FIG. 8a) to firmly connect the cleat inner tire extension 66 with the standard cleat 26.

FIG. 4d

This figures shows cleat 26 and cleat 66 joined together and ready to place on the dual tire assembly of FIG. 7a. We see a part of the bridge 68 situated between the two cleats 26 and 66, where the front overhang 44 is connected to the rear overhang of cleat 26 (46 of FIG. 4a). The cleat sleeve insert 48 of cleat 26 is now being used to hold both cleats 26 and 66 in the cleat hub (28 of FIG. 7a). A plurality of orifices 50 and fastening bars 52 are on both cleats 26 and 66.

5 ADDITIONAL INDIVIDUAL PARTS FOR DUAL TIRE APPLICATION CONTINUED 2/2

FIG. 4e illustrates the stackability feature of the cleat inner tire extension 66. Also, note the tractionable material 43 shown here on the underside of cleat 66 used for gripping against the tire tread (20 of FIG. 1a)

FIG. 8a bridge 68 is designed to sturdily hold the two cleats 26 and 66 of FIG. 7a together. With the rear overhang of cleat 26 being sandwiched within sleeve opening 67 and the front overhang of cleat 66 being sandwiched within sleeve opening 69. Female bolt 72 slides though opening 74 and merges with male bolt 70 till the cotter pin alignment openings 78 allow for the cotter pins 76 to be inserted within the installation opening 71.

FIG. 8b close up shows the top view of the bridge 68 within opening 71 with cotter pins 76 inserted through the female bolt 72 and the aligned male bolt (70 of FIG. 8a) between cleats 26 and 66 (cut off views).

6 SPECIAL APPLICATIONS 1/1

FIG. 4f shows a super single truck tire 82 and a super single rim 83. In the trucking industry, super singles were designed to replace dual tire assemblies as seen in FIG. 7a. Super single cleat 80 works in exactly the same way as the standard cleat 26 and installs in the exact same manner.

FIG. 4g shows a special designed for deep mud application cleat 84 featuring deep mud tractionable material 86. It may simply a more pronounced version of the same material of cleat (26 of FIG. 1a) or it may be made with special qualities for dealing with mud.

This cleat 84 also has a front overhang 44 and a rear overhang 46 serving to properly position cleat 84 on the tire tread (20 of FIG. 7a) and uses the same sleeve insert 48 as the standard cleat (26 of FIG. 7a). A plurality of cleat fastening bars 52 and orifices 50 allow this cleat 84 to connect to the cleat hub (28 of FIG. 7a) using the adjustable bungee cords (30 of FIG. 7a).

7 OPERATION OF FIRST EMBODIMENT WITH THREE CLEATS 1/2

Figure 9A:
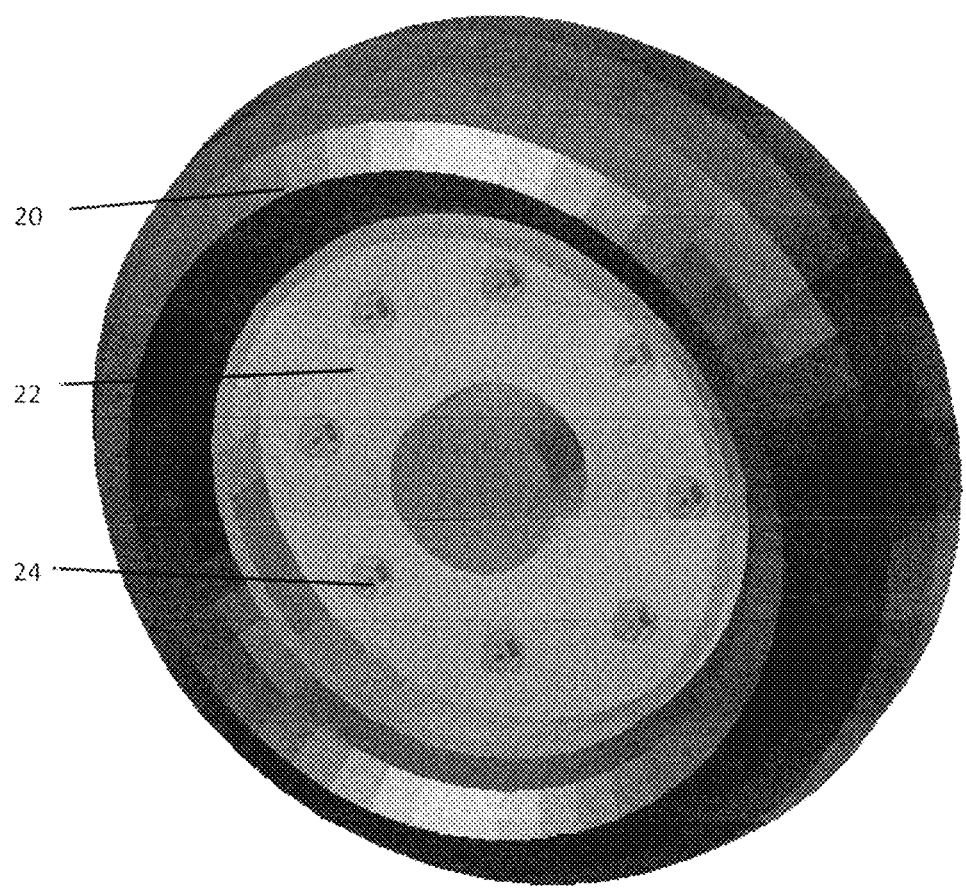

FIG. 9a starts us off with a drawing of tire 20 and rim 22 for drive and trailer tires and shows the nuts and bolts 24 inset within the rim bowl. Please assume that the tire is set on pavement (not shown). Also, all of the individual parts have been distributed to the tires you want to cleat up and you are ready to start.

Figure 9B:
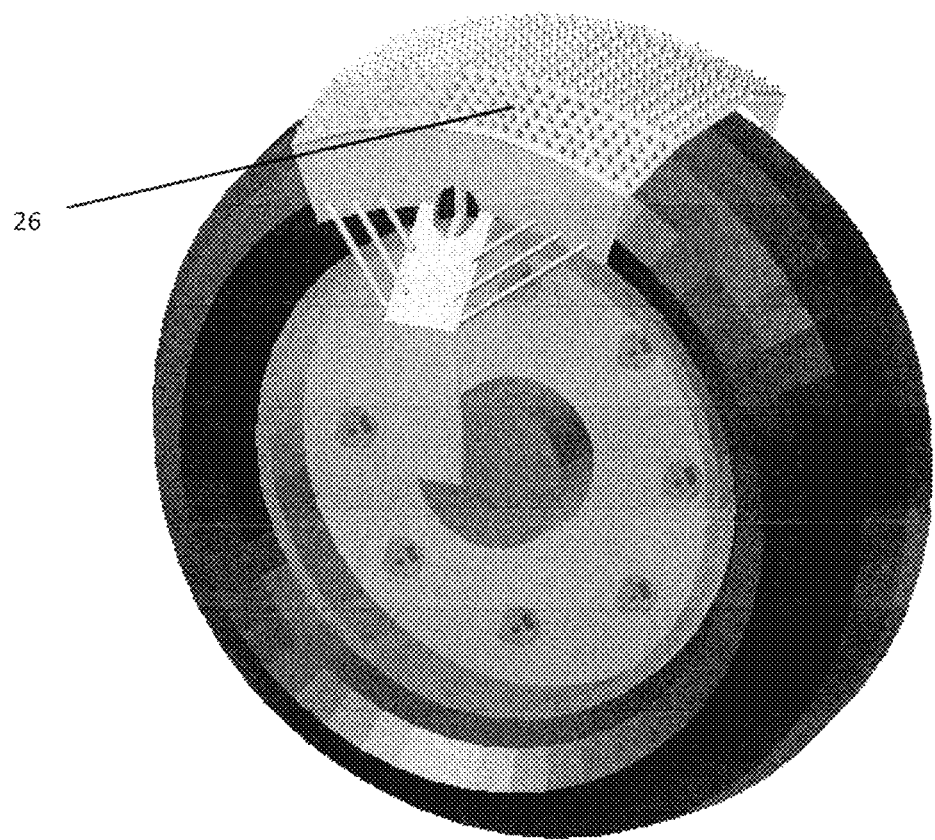

Step one, FIG. 9b, lay a cleat 26 on top of tire 20 at the twelve o'clock position.

Figure 9C:
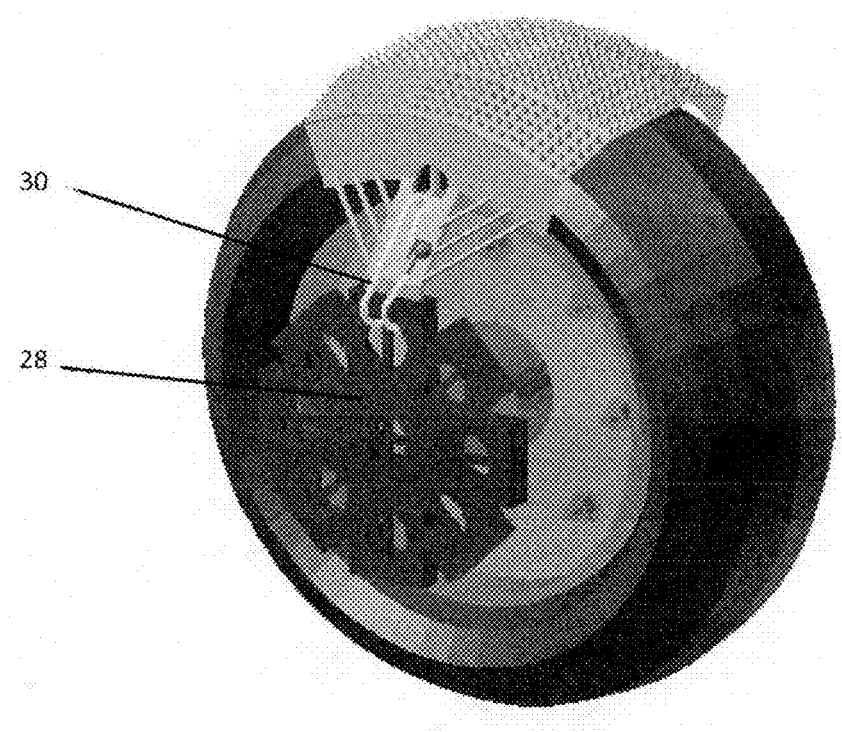

Step two, FIG. 9c, join cleat hub 28 with cleat 26 using an adjustable bungee cord 30.

Figure 9D:
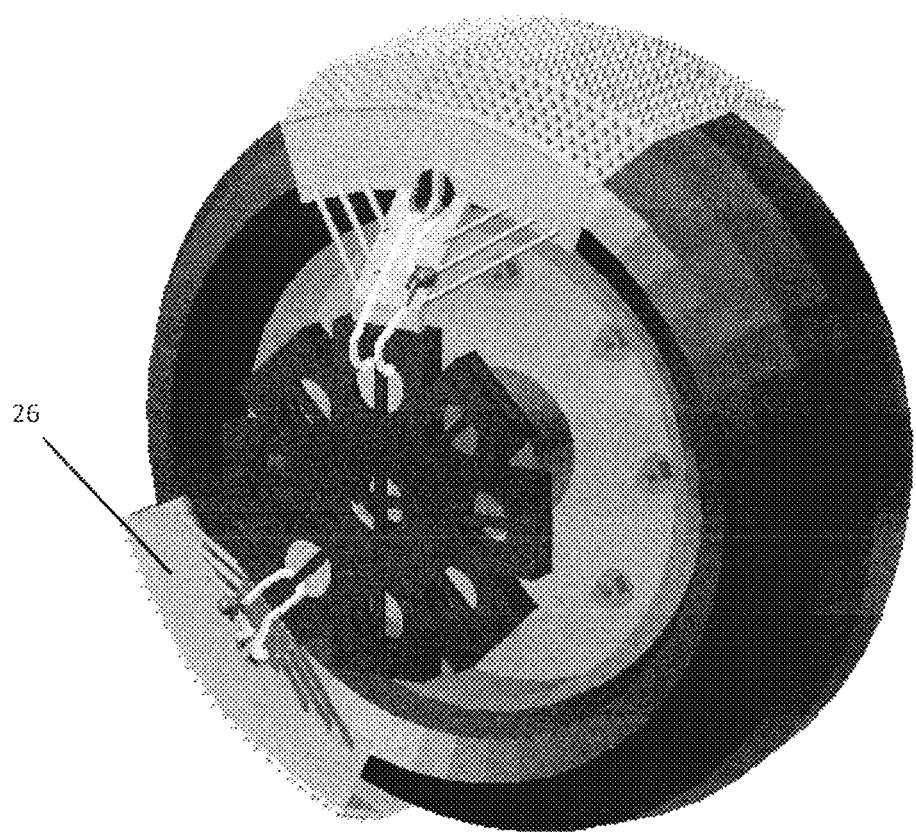

Step three, FIG. 9d, add cleat 26 on the eight o'clock position of the tire 20 and join it to cleat hub 28 with adjustable bungee cord 30.

Figure 9E:
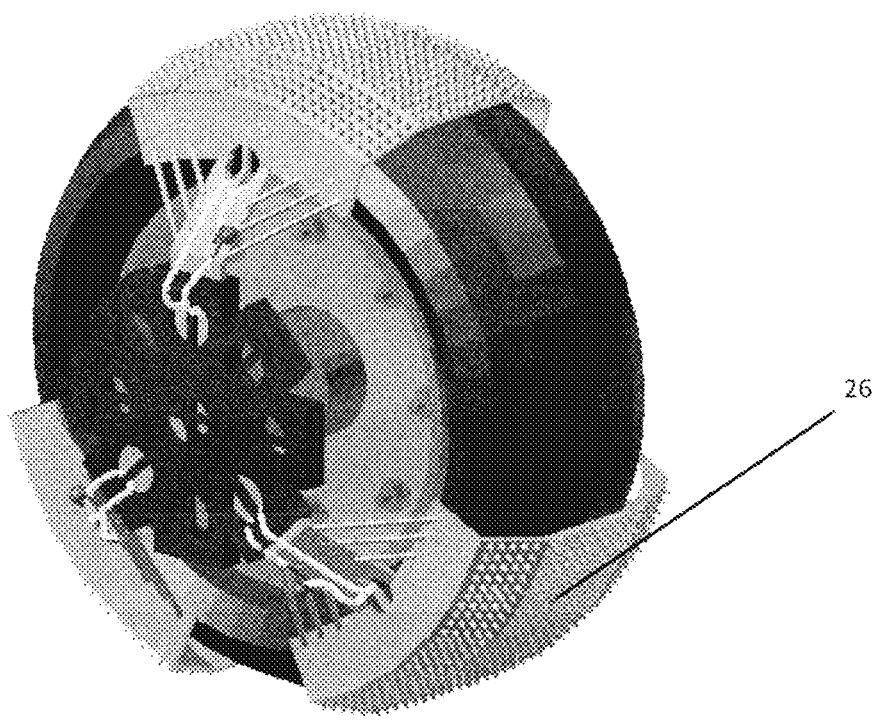

Step four, FIG. 9e, add cleat 26 on the four o'clock position of tire 20 and join it to cleat hub 28 with adjustable bungee cord 30. By now the three cleats 26 are pressed taut against the tire 20.

7 OPERATION OF FIRST EMBODIMENT WITH THREE CLEATS CONTINUED 2/2

Figure 9F:
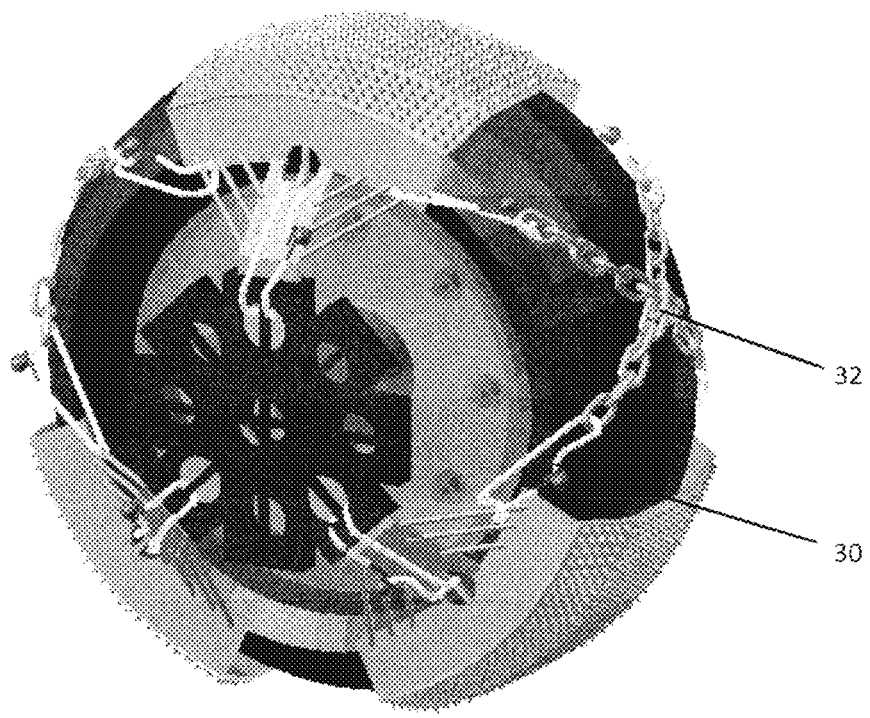

Step five, FIG. 9f, add the chain welts 32 along the tire 20 tread using adjustable bungee cords to connect the three cleats 26 to each other using the cleat fastening bars (52 of FIG. 4a). At this point, you can install chain welts at the areas between twelve o'clock and eight o'clock and between twelve o'clock and four o'clock.

Figure 9G:
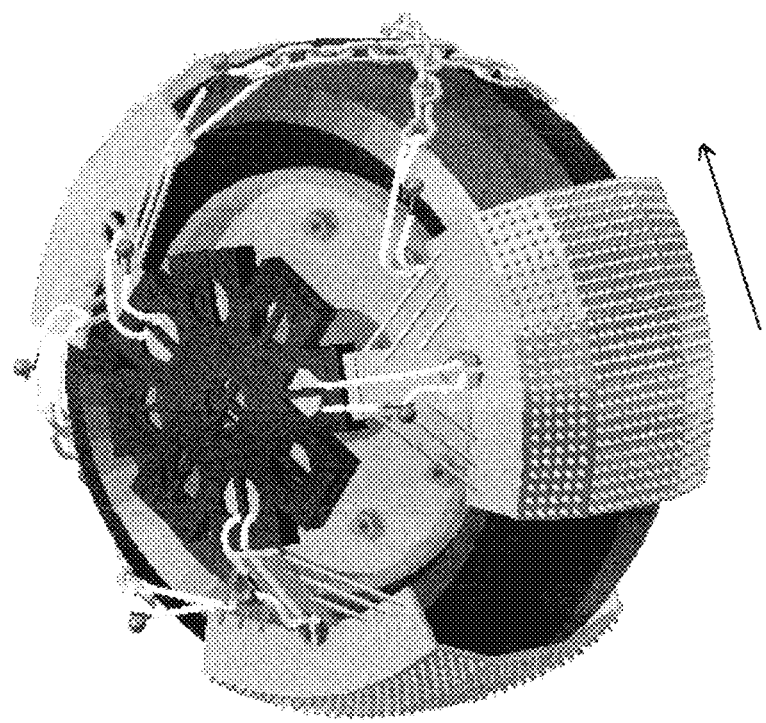
Figure 9H:
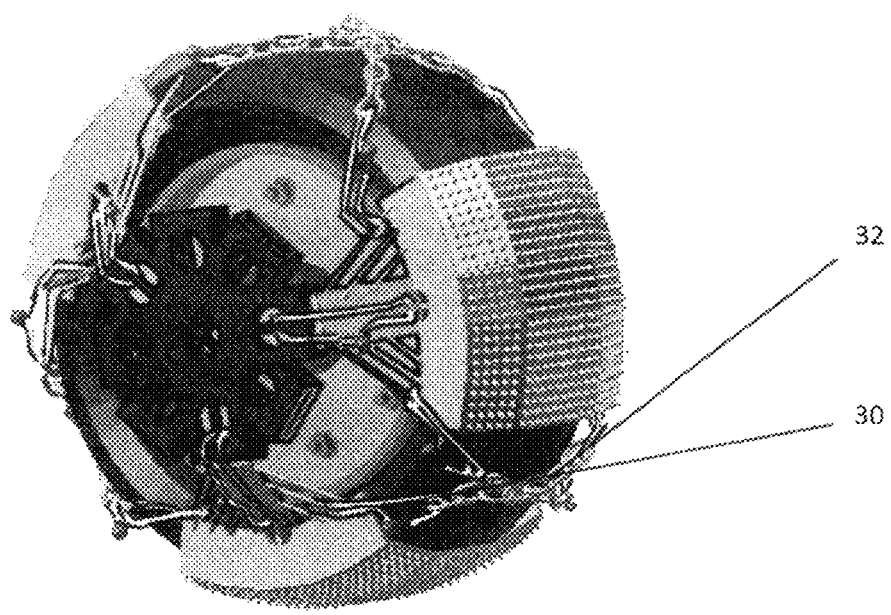

Step six, FIG. 9g, after you have gone to step five for all of the tires that you want to cleat up, move the truck forward just two feet to expose the tire 20 tread area between eight o'clock and four o'clock to finish installing the remaining chain welts 32 using the adjustable bungee cords 30. It is now complete as seen on in FIG. 9h.

8 OPERATION OF FIRST EMBODIMENT WITH FOUR CLEATS 1/2

Figure 10D:
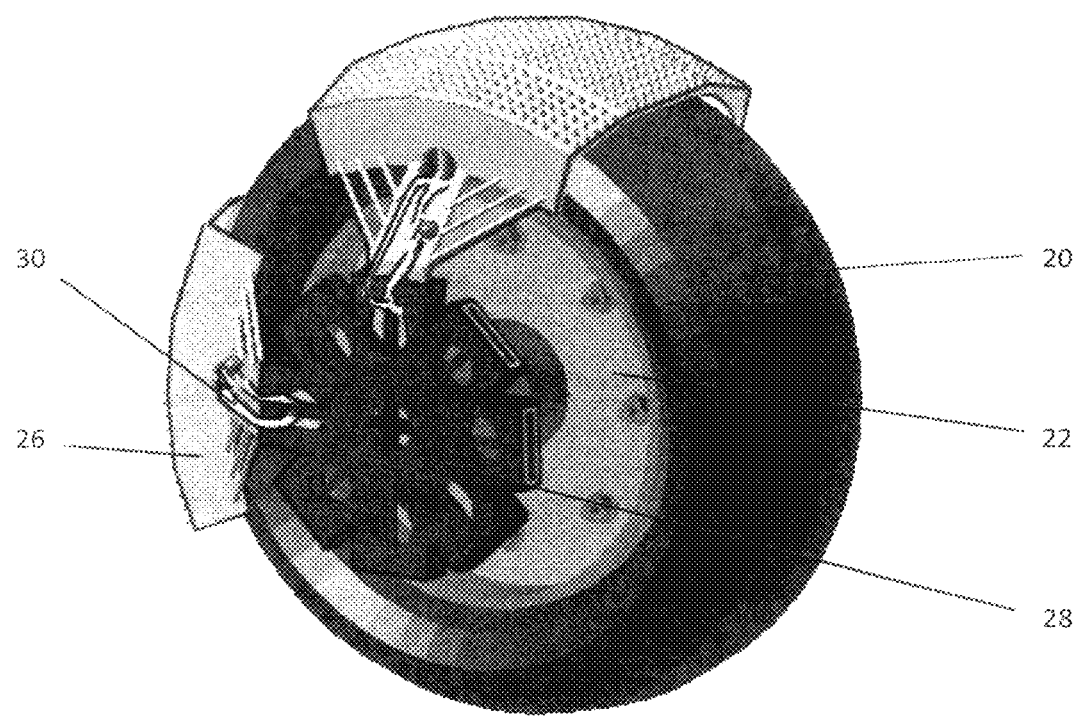

FIG. 10d begins at step three, after a repeat of FIGS. 9a, 9b, 9c, which starts us off with a drawing of tire 20 and rim 22 for drive and trailer tires and shows the nuts and bolts 24 inset within the rim bowl. Please assume that the tire is set on pavement (not shown). Also, all of the individual parts have been distributed to the tires you want to cleat up and you are ready to start.

Step one, FIG. 9b, lay a cleat 26 on top of tire 20 at the twelve o'clock position.

Step two, FIG. 9c, join cleat hub 28 with cleat 26 using an adjustable bungee cord 30.

Step three, FIG. 10d, add cleat 26 on the nine o'clock position of the tire 20 and join it to cleat hub 28 with adjustable bungee cord 30.

Figure 10E:
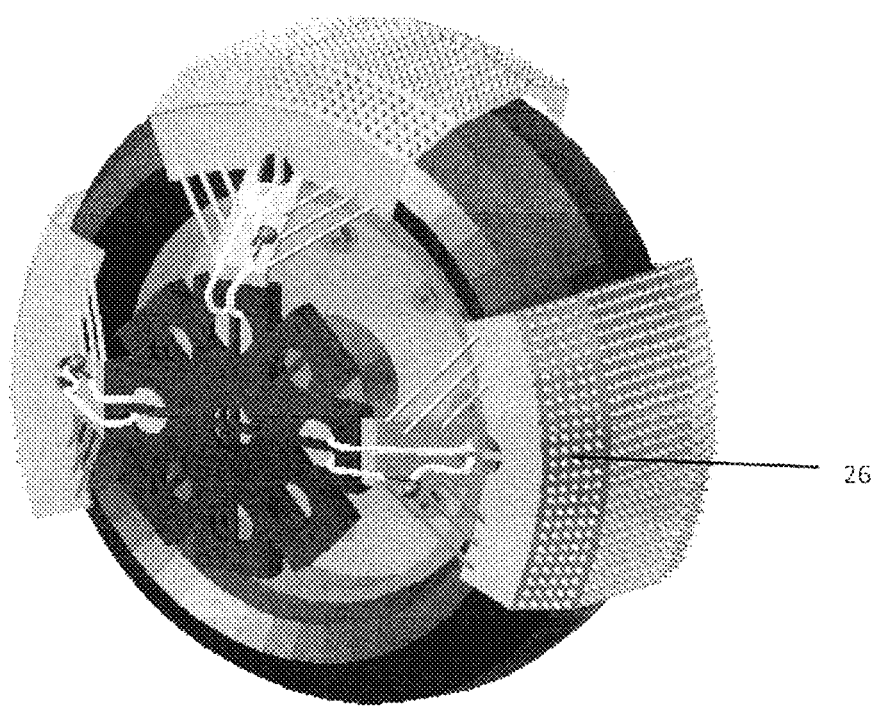

Step four, FIG. 10e, add cleat 26 on the three o'clock position of tire 20 and join it to cleat hub 28 with adjustable bungee cord 30. By now the three cleats 26 are pressed taut against the tire 20.

8 OPERATION OF FIRST EMBODIMENT WITH FOUR CLEATS CONTINUED 2/2

Figure 10F:
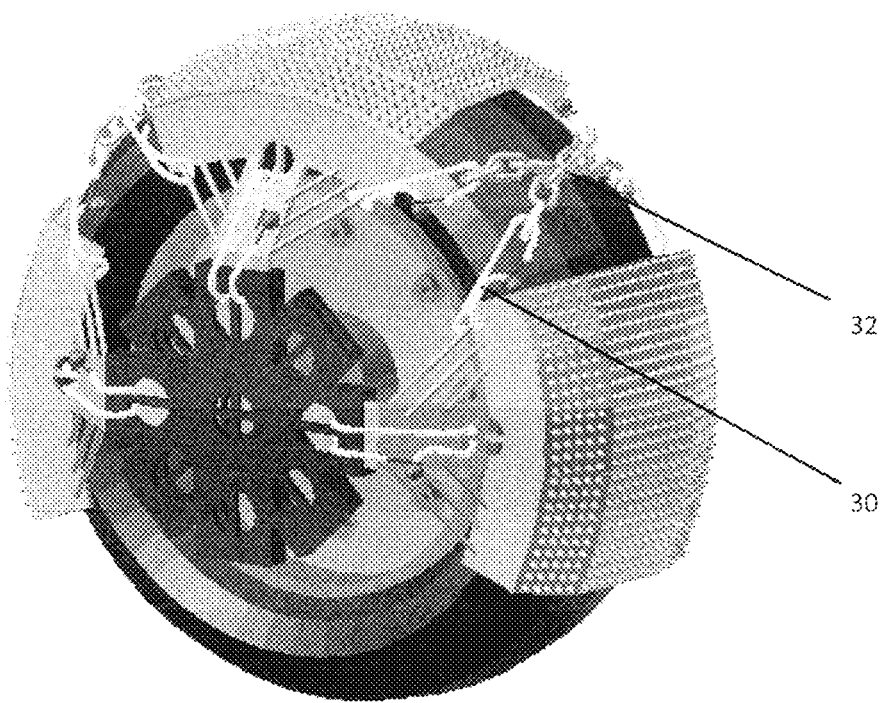

Step five, FIG. 10f, add the chain welts 32 along the tire 20 tread using adjustable bungee cords to connect the three cleats 26 to each other using the cleat fastening bars (52 of FIG. 4a). At this point, you can install chain welts at the areas between twelve o'clock and nine o'clock and between twelve o'clock and three o'clock.

Figure 10G:
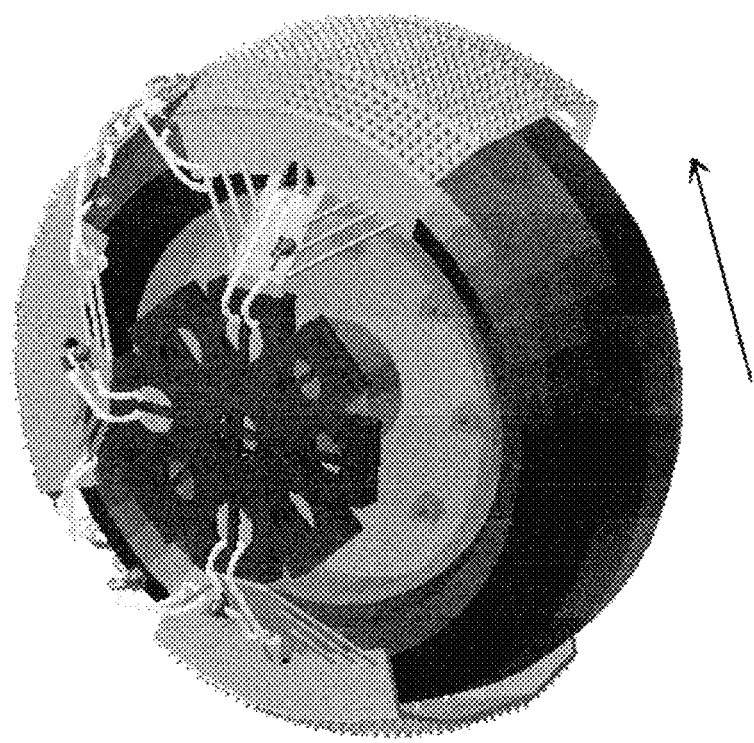

Step six, FIG. 10g, after you have gone to step five for all of the tires that you want to cleat up, move the truck forward just two feet to expose the tire 20 tread area between nine o'clock and three o'clock.

Figure 10H:
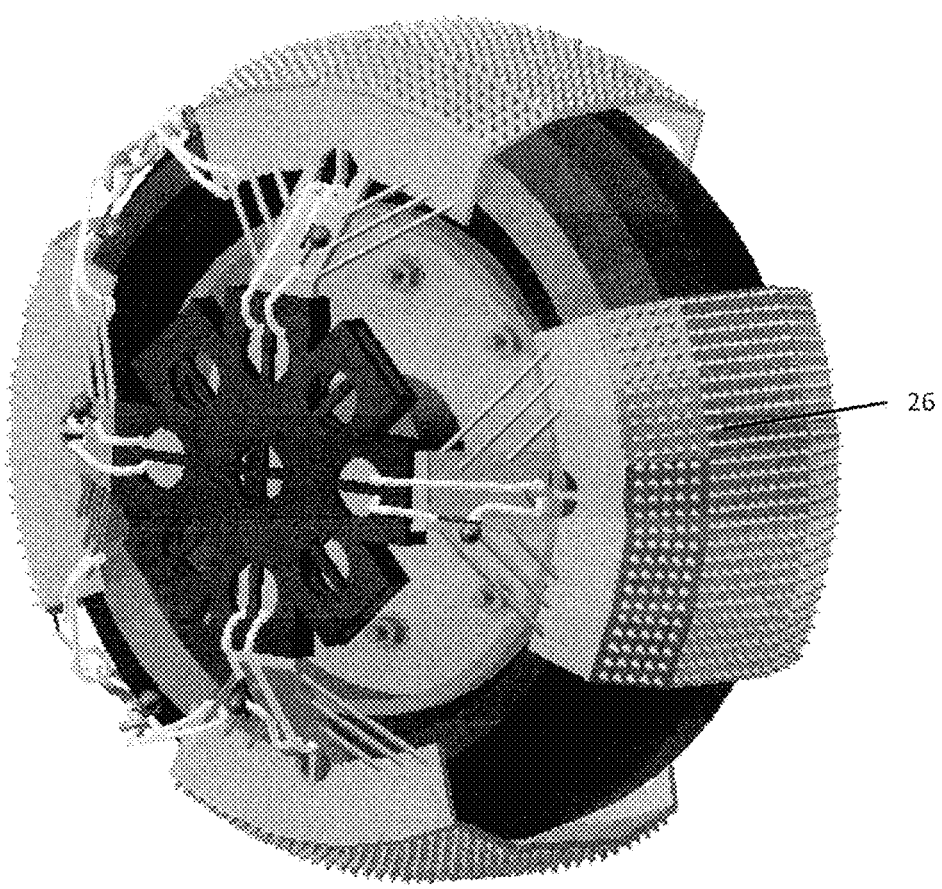
Figure 10I:
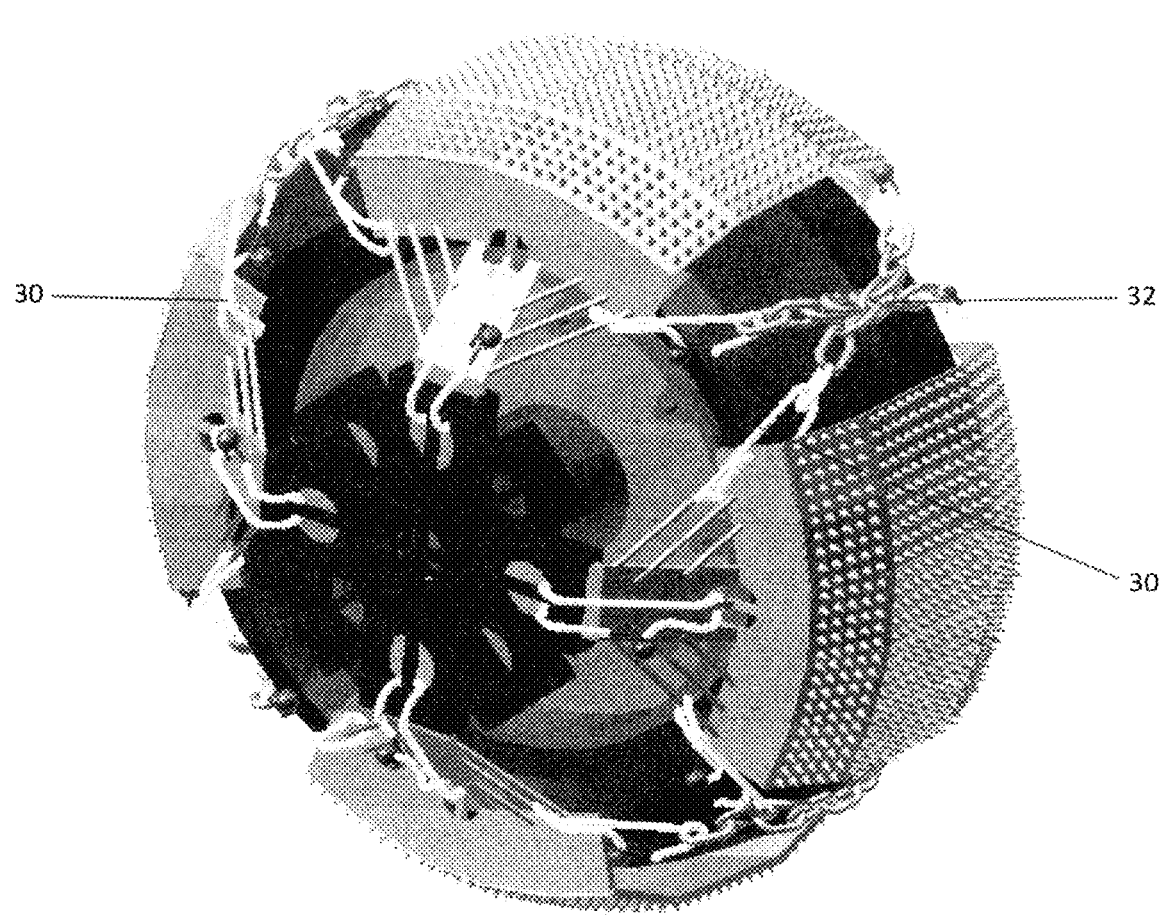

Step seven, FIG. 10h, finish installing the last cleat 26 at what was the six o'clock position of the tire 20 tread before you moved the truck and the remaining chain welts 32 using the adjustable bungee cords 30. It is now complete as seen on in FIG. 10i.

9 OPERATION OF FIRST EMBODIMENT WITH FOUR CLEATS FOR DUAL TIRE APPLICATION 1/4

First, distribute all of the individual parts to the tires you want to cleat up and you are ready to start.

Figure 11A:
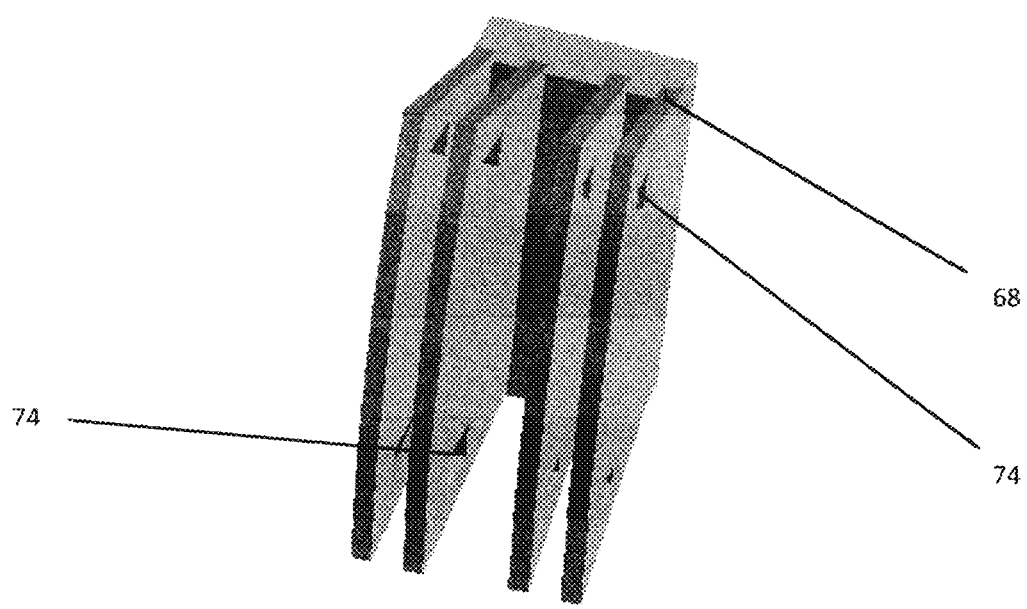

FIG. 11a begins with a bridge 68 showing the openings 74 for the bolts (70 and 72 of FIG. 8a).

Figure 11B:
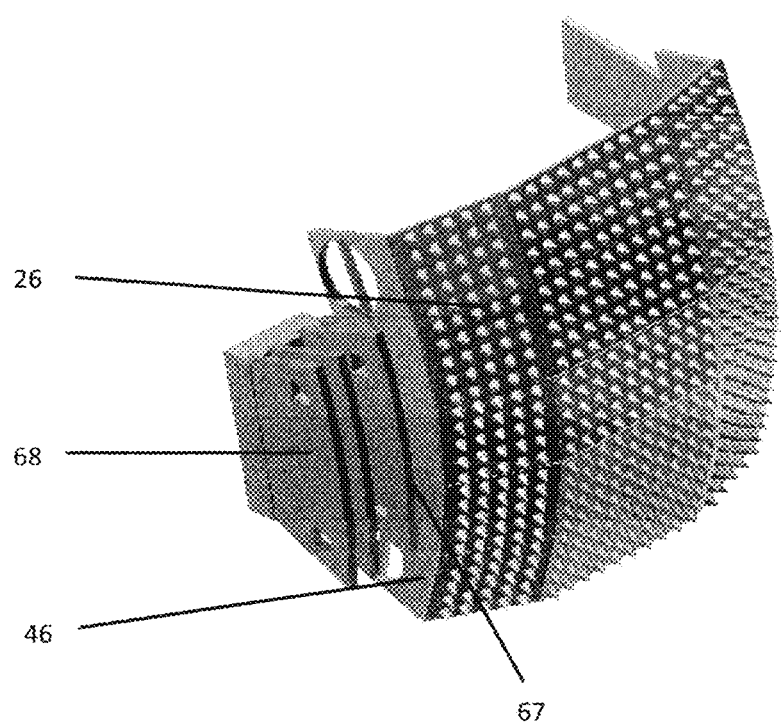

Step one, FIG. 11b, position the standard cleat 26 sliding it's rear overhang 46 into the overhang sleeve 67 of the bridge 68.

Figure 11C:
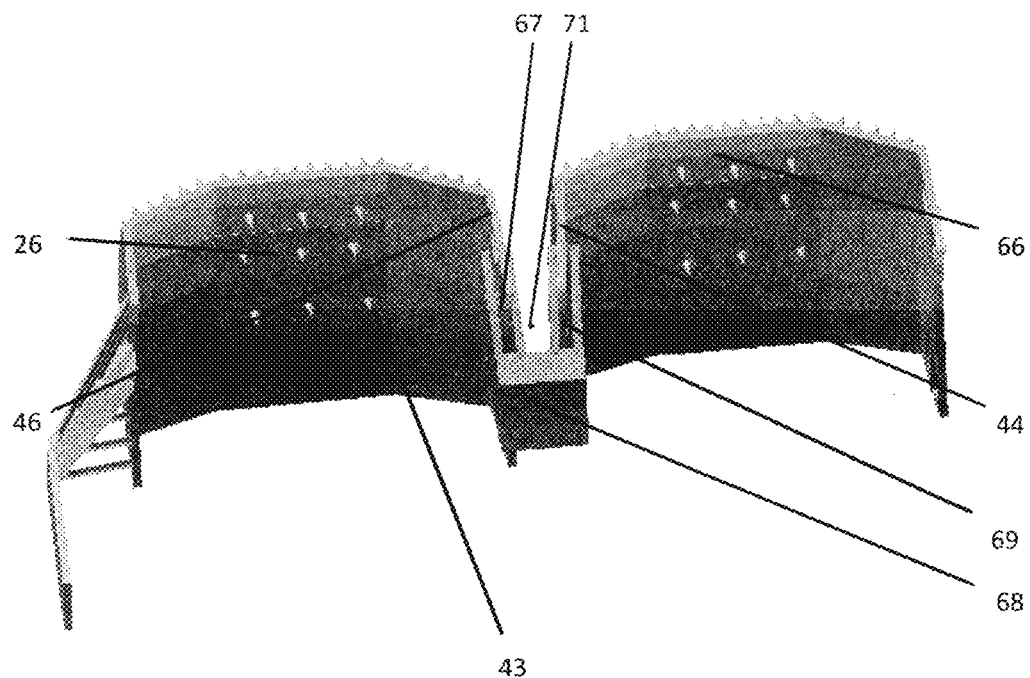

Step two, FIG. 11c, position the inner tire extension cleat 66 sliding it's front overhang 44 into the overhang sleeve 69 of the bridge 68. With rear overhang 46 of cleat 26 properly positioned within overhang sleeve 67, cleats 26 and 66 properly positioned, you are now ready to insert the bolts (70 and 72 of FIG. 8a) and cotter pins (76 of FIG. 8a) within the cotter pin installation opening 71. Also, this figure shows the underside of the cleat exposing the tractionable material 43 that would go against the tire (20 of FIG. 7a) tread.

9 OPERATION OF FIRST EMBODIMENT WITH FOUR CLEATS FOR DUAL TIRE APPLICATION CONTINUED 2/4

Figure 11D:
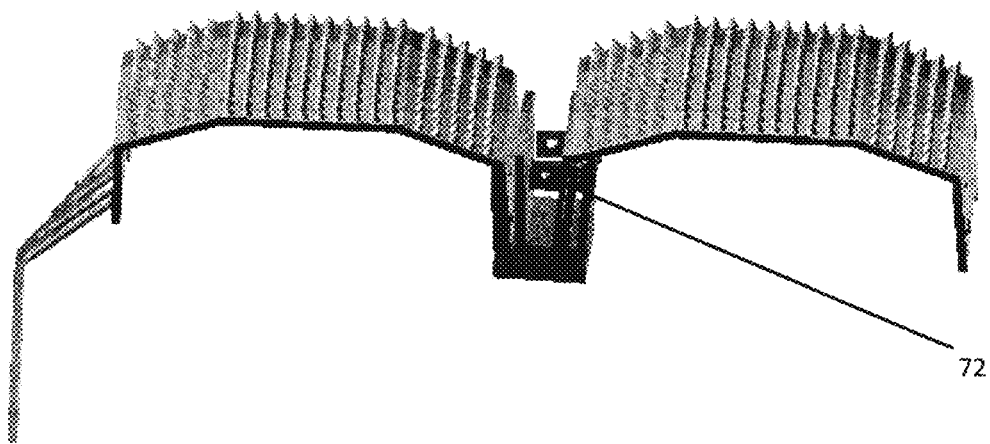

Step three, FIG. 11d, insert female bolts 72 through cleat/bridge connecting bolt openings (54 of FIGS. 4c and 74 of FIG. 8a).

Figure 11E:
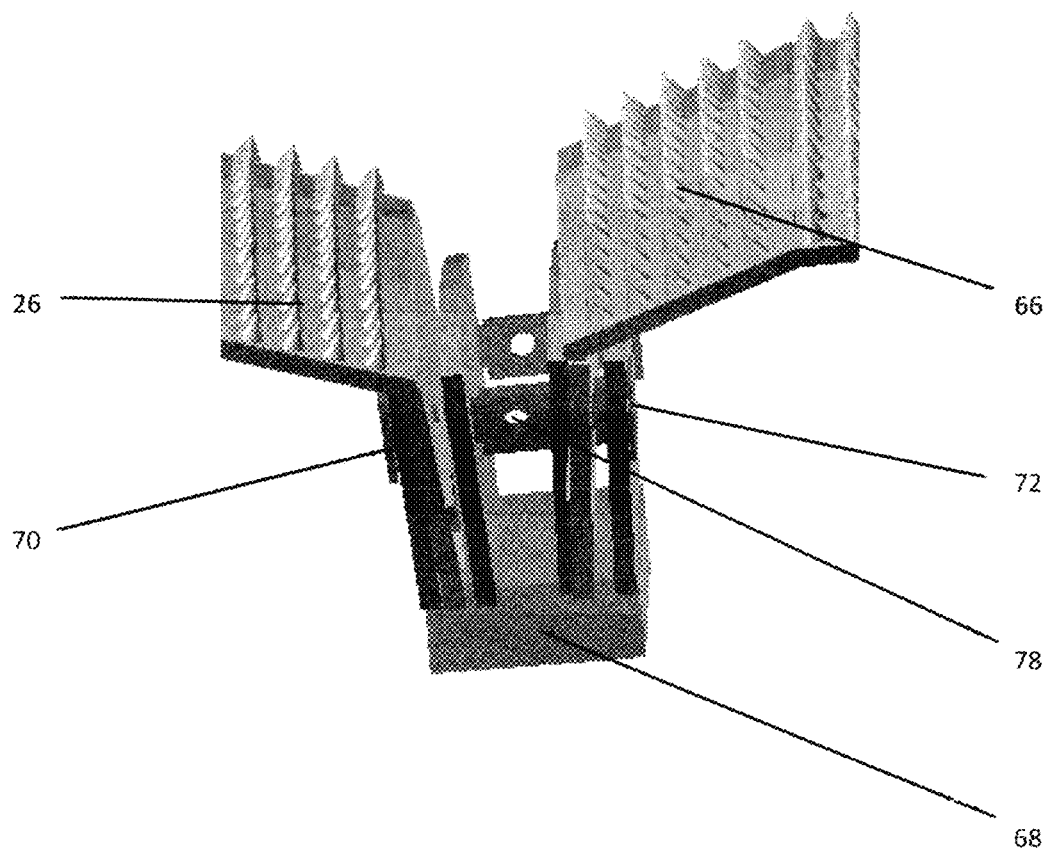

Step four, FIG. 11e, insert male bolts 70, through cleat/bridge connecting bolt openings (54 of FIGS. 4c and 74 of FIG. 8a) of the opposite side, into the female bolts 72 aligning the cotter pin alignment openings 78. We now see standard cleat 26 (cut-off view) joined with inner extension cleat 66 (cut-off view) at the bridge 68.

Figure 11F:
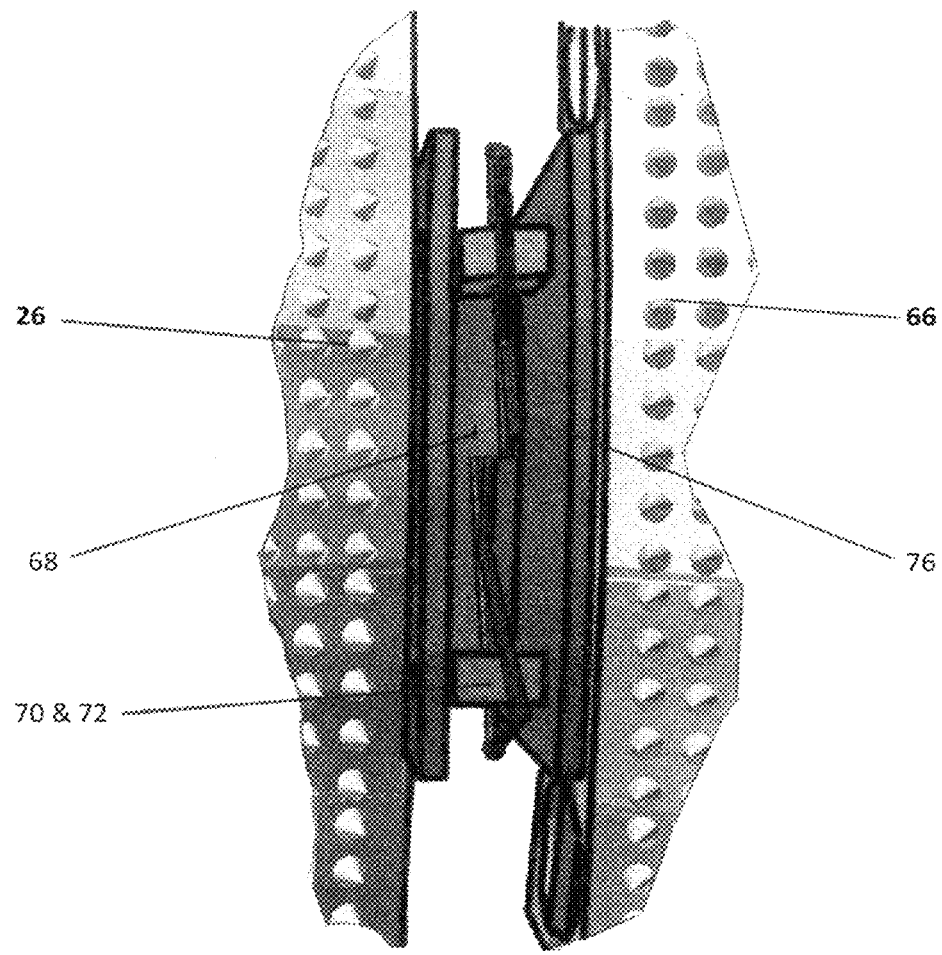

Step five, FIG. 11f, insert cotter pins 76 through the merged bolts 70 and 72 inside the cotter pin installation opening 71 of the bridge 68. We again see standard cleat 26 (cut-off view) joined with inner extension cleat 66 (cut-off view) at the bridge 68.

9 OPERATION OF FIRST EMBODIMENT WITH FOUR CLEATS FOR DUAL TIRE APPLICATION CONTINUED 3/4

At this stage, we will have joined as many cleat pairs as needed to complete the operation ahead.

Figure 11G:
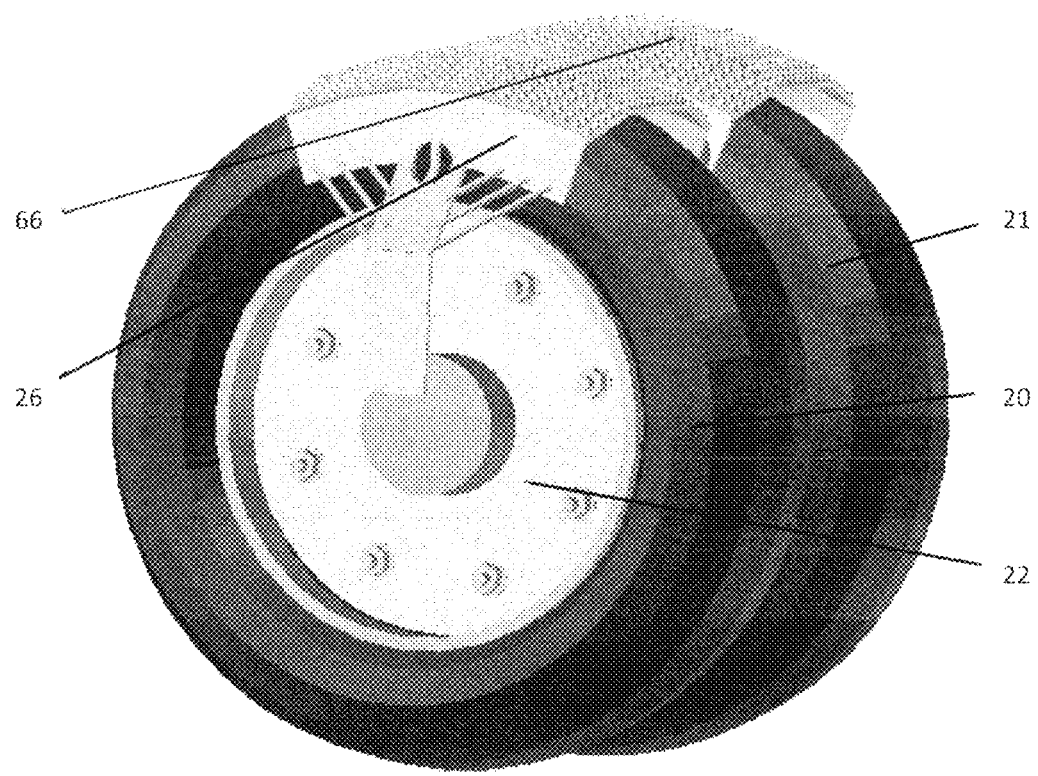

Step six, FIG. 11g, we see a set of dual tires outer 20 and inner 21, on drive tire or trailer tire rim 22, and once again assumed to be resting on a pavement (not shown). Place the newly joined pair of cleats 26 and 66 at the twelve o'clock position.

Figure 11H:
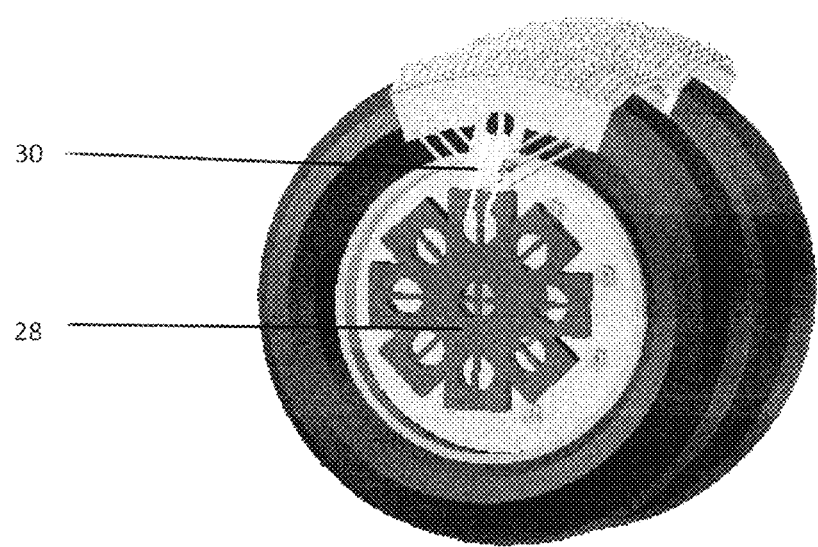

Step seven, FIG. 11h, join the cleat hub 28 to the cleat pair (26 and 66 of FIG. 11g) using an adjustable bungee cord 30.

Figure 11I:
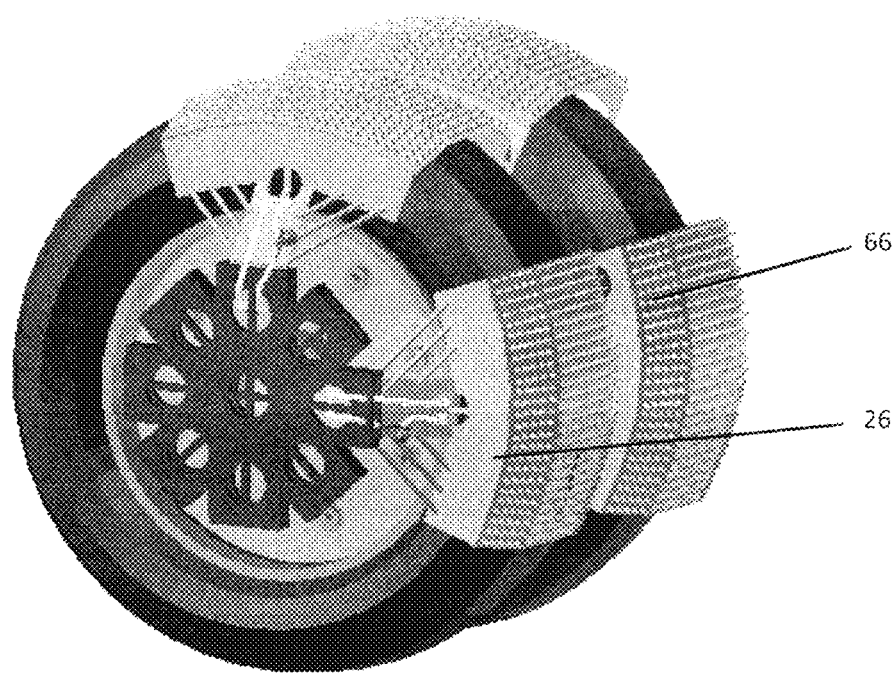

Step eight, FIG. 11i, add another newly joined cleat pair 26 and 66 to the cleat hub (28 of FIG. 11h) and dual tire set (20 and 21 of FIG. 11g) at the three o'clock position using an adjustable bungee cord (30 of FIG. 11h).

Figure 11J:
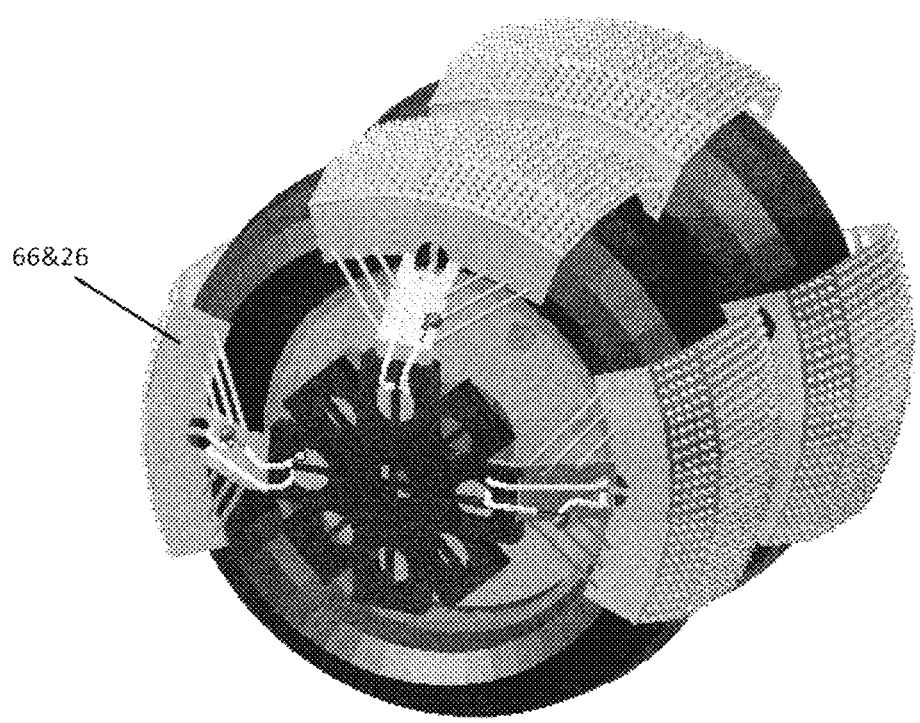

Step nine FIG. 11j, add another newly joined cleat pair 26 and 66 to the cleat hub (28 of FIG. 11h) and dual tire set (20 and 21 of FIG. 11g) at the nine o'clock position using an adjustable bungee cord (30 of FIG. 11h).

9 OPERATION OF FIRST EMBODIMENT WITH FOUR CLEATS FOR DUAL TIRE APPLICATION CONTINUED 4/4

Figure 11K:
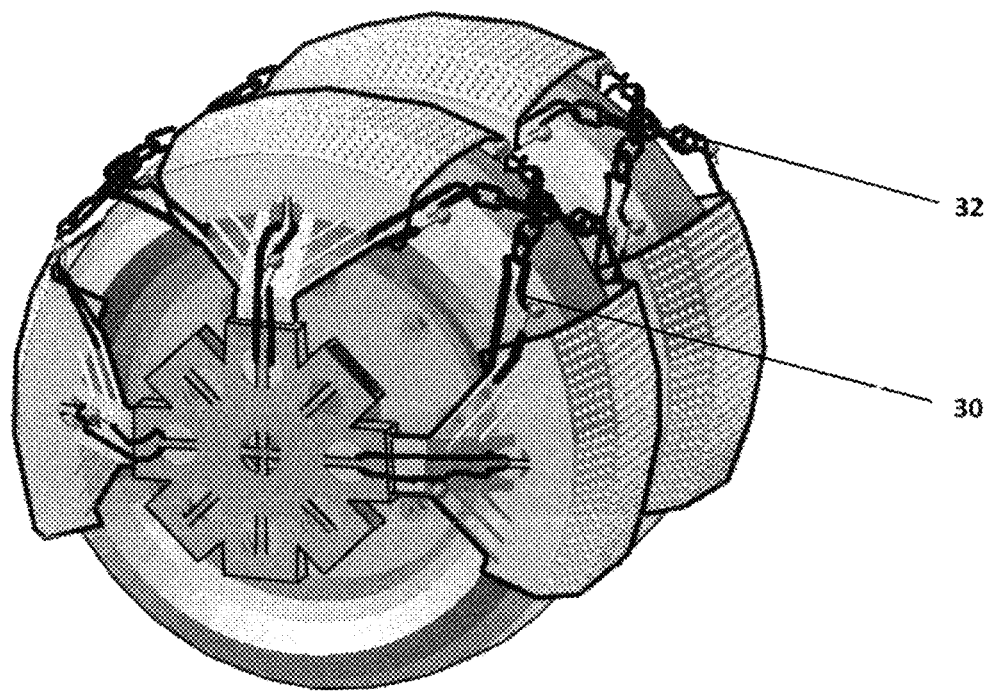

Step ten, FIG. 11k, join all the cleat pairs (26 and 66 of FIG. 11h) together using chain welts 32 and adjustable bungee cords 30 along the dual tire (20 and 21 of FIG. 11g) treads between the cleats (26 and 66 of FIG. 11h) at twelve o'clock and nine o'clock and between the cleats (26 and 66 of FIG. 11h) at twelve o'clock and three o'clock.

Figure 11L:
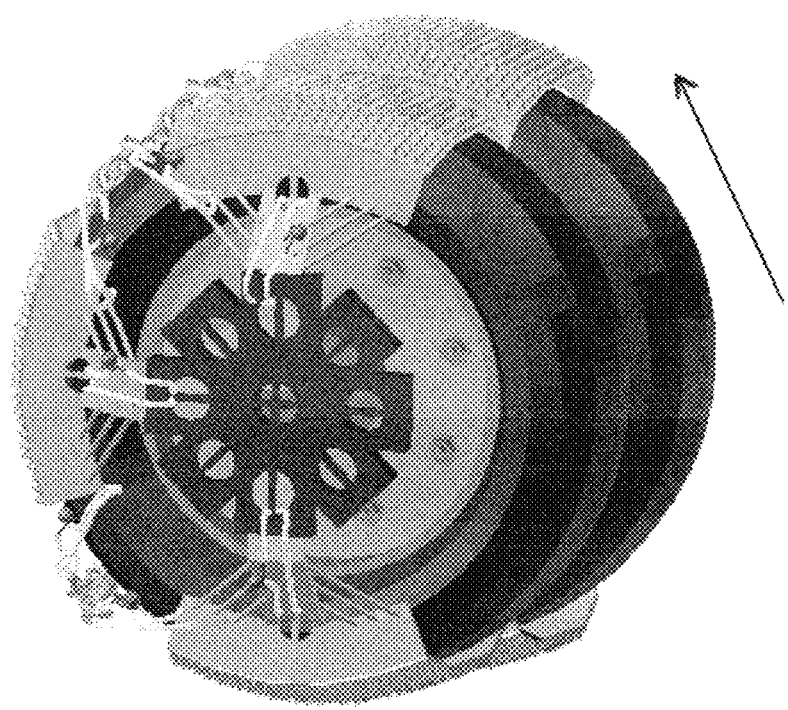

Step eleven, FIG. 11l, once all the cleat pairs (26 and 66 of FIG. 11h) at twelve o'clock, nine o'clock, and three o'clock on all the dual tire sets (20 and 21 of FIG. 11g) are installed and chained up, move the truck forward two feet to gain access to the six o'clock position that was resting on the pavement.

Figure 11M:
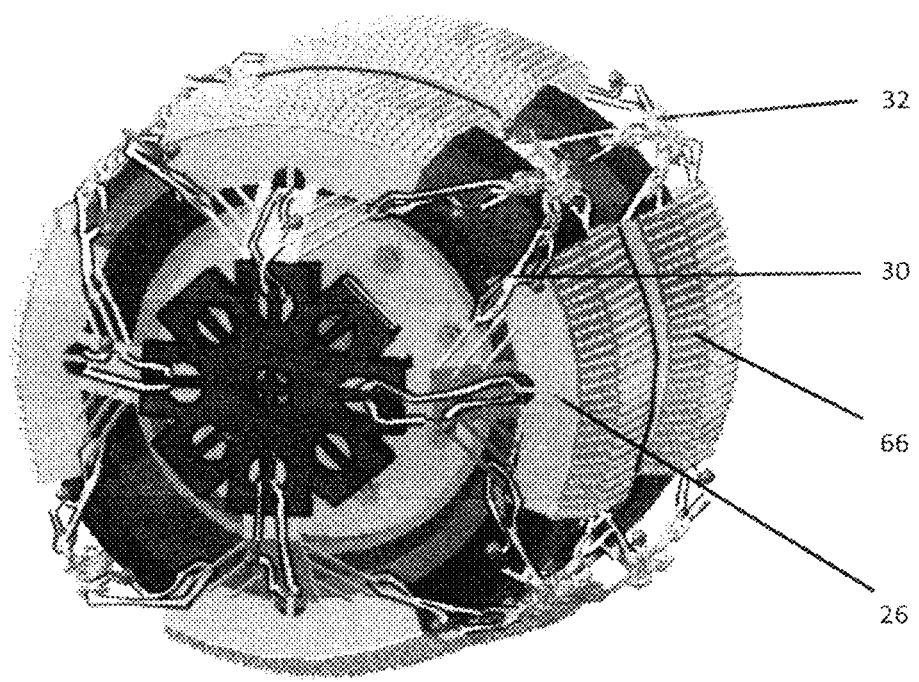

Step twelve, final step, FIG. 11m, join cleat pair (26 and 66 of FIG. 11h) to cleat hub (28 of FIG. 11h) (formerly) at the six o'clock position (before the truck was moved forward) using adjustable bungee cord (30 of FIG. 11h). Join the cleat pairs (26 and 66 of FIG. 11h) together with chain welts (32 of FIG. 11k) and adjustable bungee cords (30 of FIG. 11k) along the dual tire (20 and 21 of FIG. 11g) treads between the cleats (26 and 66 of FIG. 11h) at nine o'clock and six o'clock and between the cleats (26 and 66 of FIG. 11h) at three o'clock and six o'clock. It is now complete as seen on FIG. 11m.

10 SECOND EMBODIMMENT ADDITIONAL PARTS 1/2

This second embodiment is designed to be a quick fix method for moving out of a short term slippery situation such as can be found in a icey parking lot or icey steep grade at a stop light. A driver may choose to leave the hub (88 of FIG. 12e) installed semi permanently for the winter season to where just a cleat (26 of FIG. 12f) and adjustable bungee cord (30 of FIG. 12f) be expediciously used when the time comes.

FIG. 12a shows a single sleeved cleat hub 88 that is designed to be used for just one cleat (26 of FIG. 12f). We see the hub orifice 38 and and hub fastening bar 40 for connecting to the cleat (26 of FIG. 12f) using an adjustable bungee cord (30 of FIG. 12f). We see the female sleeve opening 36 where the cleat's (26 of FIG. 12f) sleeve insert (48 of FIG. 4a) will enter. We see the bolt 90 attached to the top surface of the single sleeved hub 88, where the connecting arms and washers (94 and 92 of FIG. 12b) will join the hub 88 to the tire rim (22 of FIG. 1a or 23 of FIG. 1b).

10 SECOND EMBODIMENT ADDITIONAL PARTS CONTINUED 2/2

FIG. 12b shows the connecting arms 94 and washers 92 which will serve to join the hub 88 of FIG. 12a to the bolts (24 of FIG. 1a) of rim (22 of FIG. 1a or 23 of FIG. 1b). Three such sets of connector arms 94 and washers 92 provide a bracing effect for a sturdy installation. The washers 92 are actually welded or mechanically well fastened to the connecting arms 94. Theses washers straddle the bolts (24 of FIG. 1a) at one end and the bolt (90 of FIG. 12a) on the surface of the cleat hub (88 of FIG. 12a) at the other end.

FIG. 12c shows the hand tightening wing nut 96 that can be used to tighten the connectors arms and washers against the bolts.

11 SECOND EMBODIMENT OPERATION 1/1

We see in FIG. 12d, beginning with a steer tire 20 and a steer tire rim 23 and showing nuts and bolts 24 where the connectors, washers, and wing nuts (92, 94, and 96 of FIG. 12e) will connect. Please assume that the tire is on pavement (not shown).

Step one, FIG. 12e, we employ a set of three connector arms 94 to properly brace the single cleat sleeve 88. The washers 92 that are permanently affixed at either end of the connector arms 94 are made to straddle the bolts 24 on the rim 23 on the one end and the bolt 90 on the surface of the single cleat sleeve 88 at the other end. This makes a sturdy and well braced cleat installation. This set up may remain semi-permanently on the rim if the driver so chooses for the winter season.

Step two, FIG. 12f, shows the final step of inserting the cleat 26 into the single sleeve of the hub (88 of FIG. 12e), and being joined using an adjustable bungee cord 30 where it connects to the hub fastening bar 40 within the hub orifice 38 on the cleat (88 of FIG. 12e).

ADVANTAGES 1/3

From the description above, a number of advantages of some embodiments of my 'Ice and Snow Cleats' become evident:

(a) The driver chooses how much weight they will carry as they distribute the various parts to each tire that they choose to cleat.

(b) The various parts, being solid material are thus easy to keep clean. The chain welts and adjustable bungee cords are stored in buckets.

(c) Depending on which materials are used for their manufacture, the only possible rust issues would be the chain welts and yet other suitable materials may be used for this chain as well, thereby resolving even this!

ADVANTAGES CONTINUED 2/3

(d) The various parts are separate. Solid bodied pieces are made stackable. So much easier to manage than the prior art of tire chains which inevitably get entangled as it is the nature of those chains, what with hooks being incorporated into the design, to entangle.

(e) The dangers of being in bad weather and being forced to pull over to the side of the road in order to comply with the authority demand to enhance tractionability are minimized by the ease of handling and speed of installation and dismantling.

ADVANTAGES CONTINUED 3/3

(f) The 'Ice and Snow Cleats' offer versatility for dealing with other situations; such as, a quick fix for:
1—dealing with icey parking lots,
2—dealing with deep mud,
3—dealing with slippery grades at a stop light.
(g) There presently exists a wide array of materials with ideal properties for the 'Ice and Snow Cleats' both individually and in advantageous combinations; such as:
1—Hard rubber with steel or fiberglass belting added for strength,
2—Kevlon,
3—Acetyl Butyl Styrene plastics,
(h) And more improvements to come as new and better materials become available. A new ecosystem for innovation is born because of the cleats!

CONCLUSIONS, RAMIFICATIONS, AND SCOPE 1/2

Accordingly, the reader will see that the 'Ice and Snow Cleats', in it's various embodiments, provide a quicker and easier way to add DOT-required tractionabilty to tires as follows:
1—Quicker because there is no having to deal with the entangled chains of the prior art. Building the required tractionabilty at each chosen tire should take no more than five minutes, even for a novice individual. It is equally quick to dismantle and store away.
2—Easier because the individual parts can be carried independently according to how much weight the driver wishes to bear while distributing the parts to the chosen tires. In fact, some materials may allow that no single part weighs more than five pounds.
3—Cleaner because the major parts are easily amenable to being hosed down due to solid surface properties of both the cleats and the hub.
4—Versatile because of special design features to address quick fix needs like icey parking lots, slippery grades at stop lights, and deep mud situations.

CONCLUSIONS, RAMIFICATIONS, AND SCOPE 2/2

5—Thanks to the cleats, from now on, it will be very easy to experiment with various combinations of materials. As new materials come to market, cleats will be a ready testing ground for them.

Although the description above cover many specificities, these should not be construed as limiting the scope of the embodiments but as merely providing illustrations of some of several embodiments. For example, the adjustable bungee cords may be made of rubber, and may include s-hooks for even quicker installation if the driver so chooses. The chain welts may be replaced by thick cable. The cleat hub may use cylindrical sleeves and may offer more degrees of insertion for the cleats. The cleats may function on their own without a need for chain welts at all. These are issues determined by DOT authorities when they have concluded their testing.

Thus the scope of the embodiments should be determined by the appended claims and their legal equivalents, rather than by the examples given.

I claim:

1. An article of manufacture comprising:
   a. a plurality of cleats, an underside of said cleats being configured to hold against a tire tread and an outerside of said cleats being configured to mitigate a slippery road surface,
   b. a cleat hub, said cleat hub being rigid in order to maintain said cleats at prescribed degrees of locality around a perimeter of said tire tread,
   c. a means for joining the plurality of cleats to the cleat hub and when joined, a contiguous unit is formed that secured and wrapped tightly around the perimeter of said tire tread,
   wherein the cleat hub has a plurality of hub sleeve housings and each of the cleats have a cleat sleeve insert configured to fit inside one of the hub sleeve housings such that the cleat sleeve insert slides inside the respective hub sleeve housing to press the cleats taut against said tire tread,
   wherein the cleat hub comprises a plurality of hub orifices with hub fastening bars therein which make hub anchoring areas,
   wherein each of the cleats have a cleat orifice with a cleat fastening bar therein which make a cleat anchoring area, and
   wherein the joining means comprise a plurality of elastic members, each elastic member configured to be anchored at one of the hub anchoring areas and one of the cleat anchoring areas in order to form the contiguous unit.

2. The article of manufacture as defined in claim 1, wherein each of the cleats is configured to straddle across the entire breadth of said tire tread along a predetermined section of the perimeter of said tire.

3. The article of manufacture as defined in claim 2, wherein each of the cleats is configured to have front and rear overhangs at said tire tread when applied to the tire tread, thereby maintaining each of said cleats properly straddled on said tire tread.

4. The article of manufacture as defined in claim 2, wherein each of the cleats is composed of at least one material selected from a group consisting of fiberglass, plastics, hard rubber, aluminum, and Kevlar, thereby providing adequate rigidity and strength to the body of each of the cleats.

5. The article of manufacture as defined in claim 2, wherein the underside of each of the cleats comprise at least one material selected from a group consisting of foam and soft rubber in order to conform to the contours of said tire tread.

6. The article of manufacture as defined in claim 2, wherein the outerside of each of the cleats comprise at least one material selected from a group consisting of fiberglass, plastic, hard rubber, aluminum, and Kevlar being specially shaped thereby providing the required tractionabilty to mitigate the slippery road surface.

7. The article of manufacture as defined in claim 2, wherein said plurality of hub sleeve housings each comprise a female sleeve opening and are situated all around an outer perimeter of said cleat hub.

8. The article of manufacture as defined in claim 1, wherein said cleat hub is composed of at least one material selected from a group consisting of plastic, fiberglass, hard rubber, aluminum, and Kevlar, thereby providing adequate rigidity for keeping said cleats at predetermined intervals along said tire tread perimeter.

9. The article of manufacture as defined in claim 7, wherein said female sleeve openings of said cleat hub provide a snug fit for said cleat sleeve inserts thereby maintaining a rigid contiguous assembly while also allowing said inserts to slidably enable a taut pressure of said cleats against said tire treads when urged by said means for joining.

10. The article of manufacture as defined in claim 1, wherein said means for joining said cleats to said cleat hub are selected from a group consisting of bungee cords, rubber straps, S-hooks, and springs thereby providing sufficient elasticity to the entire assembly and enabling said taut pressure of said cleats against said tire tread.

11. The article of manufacture as defined in claim 10, wherein the means for joining are the bungee cords, and
    wherein the bungee cords are adjustable and comprise a plurality of vice screws within adjustable cord ball orifices of adjustable cord balls, thus allowing for tightening against said bungee cords thereby regulating the effective length of said adjustable bungee cords.

12. The article of manufacture as defined in claim 11, further comprising a plurality of chain welts of sufficient length for joining said cleats along exposed areas of said tire tread and of sufficient thickness to also mitigate the slippery road surface along with said cleats.

13. The article of manufacture as defined in claim 12, wherein said plurality of adjustable bungee cords are also configured to join said chain welts to said cleats all around the perimeter of said tire tread.

14. The article of manufacture as defined in claim 1, further comprising a plurality of cleat inner tire extensions and a plurality of cleat inner tire extension bridges,
    wherein the cleat inner tire extension bridges are configured to connect the cleat inner tie extensions to the plurality of cleats so as to provide tractionability to an inner tire as well as an outer tire of a dual tire assembly.

15. The article of manufacture as defined in claim 14,
    wherein each of the cleat inner tire extension bridges further comprise a plurality of male bolts, a plurality of female bolts, and a plurality of cotter pins, said male bolts and female bolts comprising cotter pin alignment openings, and
    wherein each of the cleat inner tire extension bridges are configured to connect a respective one of the cleats to a respective one of the cleat inner tire extensions by sandwiching a cleat rear overhang of the respective one of the cleats and a cleat front overhang of the respective one of the cleat inner tire extensions, inserting the male bolts into the female bolts, and inserting the cotter pins into the cotter pin alignment openings.

16. The article of manufacture as defined in claim 14, wherein said cleat rear overhangs and said cleat inner tire extension front overhangs have a plurality of cleat inner tire extension bolt openings to allow the connecting of said respective cleat with said respective cleat inner tire extension.

17. The article of manufacture as defined in claim 14, wherein each of said cleat inner tire extension bridges contain:
  a. an overhang sleeve for sandwiching a cleat rear overhang of said respective cleat,
  b. an overhang sleeve for sandwiching a cleat front overhang of said respective cleat inner tire extension,
  c. a cotter pin installation opening,
  d. a plurality of cleat inner tire extension bridge bolt openings.

18. The article of manufacture as defined in claim 1, wherein said cleats have a width that corresponds to a size of the tire to which said cleats are configured to be applied may.

19. An article of manufacture as defined in claim 1, wherein said cleats are configured to address road conditions of ice and snow, mud, wet leaves, and/or oil.

20. The article of manufacture as defined in claim 1, wherein said cleats incorporate a well distributed bed of rock salt crystals along the outside of said cleats to provide immediate needs of tractionability as well as a longer term accommodation of introducing salt brine to the road surface thereby making the road safer for the next driver.

* * * * *